US008386355B1

(12) United States Patent (10) Patent No.: US 8,386,355 B1
Kajiwara et al. (45) Date of Patent: Feb. 26, 2013

(54) SYSTEM AND METHOD FOR DEFINING, STRUCTURING, AND TRADING POLITICAL EVENT CONTRACTS

(75) Inventors: Kevin Genta Kajiwara, Bedford, NY (US); Ian Arthur Bremmer, New York, NY (US); Ross D. Schaap, White Plains, NY (US); Dan Alex Alamariu, Brooklyn, NY (US)

(73) Assignee: Eurasia Group Ltd., New York, NY (US)

( * ) Notice: Subject to any disclaimer, the term of this patent is extended or adjusted under 35 U.S.C. 154(b) by 523 days.

(21) Appl. No.: 12/488,126

(22) Filed: Jun. 19, 2009

(51) Int. Cl.
*G06Q 40/00* (2012.01)

(52) U.S. Cl. ............... 705/36; 705/80; 705/7.13; 705/2; 705/7.28; 709/231

(58) Field of Classification Search ............... 705/1, 7, 705/36, 38, 80, 7.13, 7.28, 2; 726/25; 709/231
See application file for complete search history.

(56) References Cited

U.S. PATENT DOCUMENTS

| | | | | |
|---|---|---|---|---|
| 7,698,148 | B2 * | 4/2010 | Lavu et al. | 705/1.1 |
| 7,761,359 | B2 * | 7/2010 | Sanwal et al. | 705/36 R |
| 7,809,595 | B2 * | 10/2010 | Breslin et al. | 705/7.28 |
| 8,135,638 | B2 * | 3/2012 | Gopfert et al. | 705/35 |
| 2004/0015376 | A1 * | 1/2004 | Zhu et al. | 705/7 |
| 2005/0027649 | A1 * | 2/2005 | Cech | 705/38 |
| 2006/0190316 | A1 * | 8/2006 | Dankowych et al. | 705/9 |
| 2008/0040257 | A1 * | 2/2008 | Nafeh et al. | 705/37 |
| 2008/0059208 | A1 * | 3/2008 | Rockfeller et al. | 705/1 |
| 2009/0089149 | A1 * | 4/2009 | Lerner et al. | 705/10 |

OTHER PUBLICATIONS

Letter from John W. Labuszewski, Managing Director, Research & Product Development, CME Group to Thomas Leahy, Acting Deputy Director, Market and Product Review, CFTC, dated Aug. 7, 2007.
Remarks Regarding Event Contracts by Commodities Futures Trading Commission Acting Chairman Walter Lukken, Mar. 13, 2008.
Concept Release on the Appropriate Regulatory Treatment of Event Contracts, Request for Public Comment, Federal Register, May 7, 2008, vol. 73, No. 89, pp. 25669-25674.
Proposed: Geopolitical Event Contracts (two pages) (CME Group and Eurasia Group).
Comments filed re: Concept Release on the Appropriate Regulatory Treatment of Event Contracts, Federal Register Comment File 08-004.

* cited by examiner

*Primary Examiner* — Tien Nguyen
(74) *Attorney, Agent, or Firm* — Fried, Frank, Harris, Shriver & Jacobson LLP

(57) ABSTRACT

A system and method for defining, structuring, and trading political event contracts is disclosed that implement a systematic process for defining political event contracts. The systematic process comprises a rigorous taxonomy of risk event classes that delimit the types of contracts to be defined. An event relevance scoring mechanism determines whether a derivative instrument embodying a specified event is economically warranted and useful to the marketplace as a mechanism for hedging risks not easily addressed through other market tools. The disclosed apparatus further comprises apparatus for modeling the value of a specified political event contract that captures both rational and intuitive analysis about an event using criteria based decision trees to provide highly structured calculation of relative probabilities. The tree components are weighted and compared by an analyst or other user to determine probabilities for various alternative outcomes to a specified political event.

3 Claims, 29 Drawing Sheets

320

| Event Name 322 | | Event Class 324 | Event Type 326 | Score 328 | Is Binary Call Market Relevant? 330 |
|---|---|---|---|---|---|
| US/ Israeli Strike on Iranian Nuclear Facilities | | International Warfare | Confirmed airstrikes and other incursions | *** | *** |

| Assets Impacted 332 | Geographic Impact 336 | | | | Estimated magnitude of impact (given geographic location) 334 | Political insurance for event class? 338 | Event Hedgeable by Simple (Vanilla) Market Transaction 340 | Historical precedents or analogous events (write in event) |
|---|---|---|---|---|---|---|---|---|
| | Global | Regional | Country | Sub-state (eg. city, province) | Industry specific | | | |
| Equity Markets | X | X | X | | X | Catastrophic | No | No | Yom Kippur War 1973 |
| Corporate Debt Markets | X | X | X | X | X | Medium | No | Yes | Iraq 2003, Yom Kippur War 1973 |
| Sovereign Debt Markets | X | X | X | X | | Low | No | Yes | Osirak 1981, Iraq 2003 |
| Commodity Markets | X | X | X | X | X | Catastrophic | No | Yes | Yom Kippur War 1973 |
| Corporate financial assets | | X | X | X | X | High | Yes | No | Osirak 1981, Iraq 2003, Yom Kippur War 1973 |
| Corporate infrastructure/ plant | | X | X | X | X | Catastrophic | Yes | No | Yom Kippur War 1973, Serbia-Kosovo 1998 |
| Corporate staff safety/ ability to operate | | X | X | X | X | Catastrophic | Yes | No | Osirak 1981, Iraq 2003, Yom Kippur War 1973 |

320

| Event Name 322 | Event Class 324 | Event Type 326 | Score 328 | Is Binary Call Market Relevant? 330 |
|---|---|---|---|---|
| US/ Israeli Strike on Iranian Nuclear Facilities | International Warfare | Confirmed airstrikes and other incursions | *** | *** |

| Assets impacted 332 | Geographic Impact 336 | | | | Estimated magnitude of Impact (given geographic location) 334 | Political insurance for event class? 338 | Event Hedgeable by Simple (Vanilla) Market Transaction 340 | Historical precedents or analogous events (write in event) |
|---|---|---|---|---|---|---|---|---|
| | *Global* | *Regional* | *Country* | *Sub-state (eg. city, province)* | *Industry specific* | | | |
| Equity Markets | X | X | X | | | Catastrophic | No | No | Yom Kippur War 1973 |
| Corporate Debt Markets | X | X | X | X | X | Medium | No | Yes | Iraq 2003, Yom Kippur War 1973 |
| Sovereign Debt Markets | X | X | X | X | | Low | No | Yes | Osirak 1981, Iraq 2003 |
| Commodity Markets | X | X | X | X | X | Catastrophic | No | Yes | Yom Kippur War 1973 |
| Corporate financial assets | | X | X | X | X | High | Yes | No | Osirak 1981, Iraq 2003, Yom Kippur War 1973 |
| Corporate infrastructure/ plant | | X | X | X | X | Catastrophic | Yes | No | Yom Kippur War 1973, Serbia-Kosovo 1998 |
| Corporate staff safety/ ability to operate | | X | X | X | X | Catastrophic | Yes | No | Osirak 1981, Iraq 2003, Yom Kippur War 1973 |

Fig. 3B

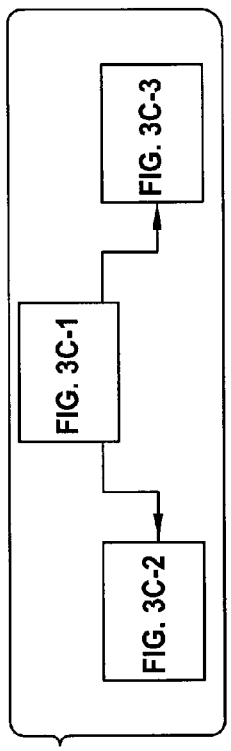
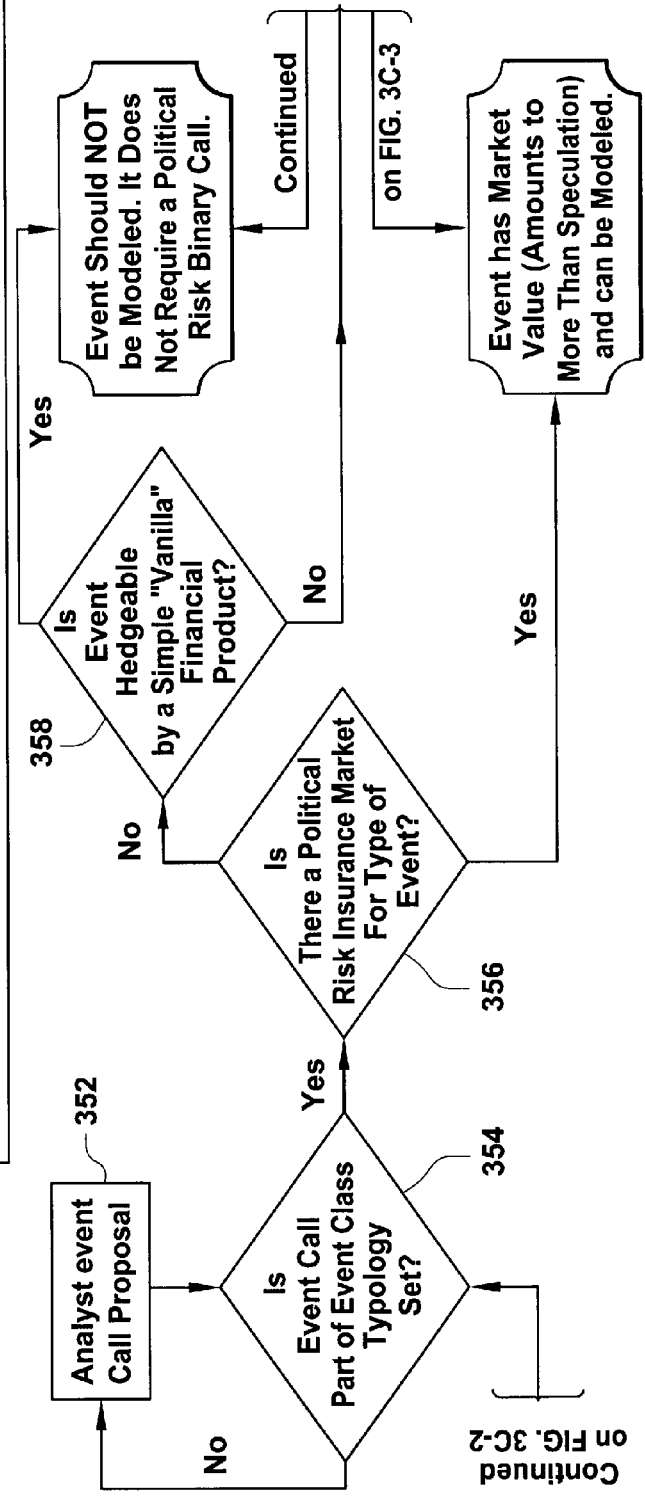

FIG. 3C-2  Event Class Typology Set

Typology of events for Political Risk Binary Calls (Illustrative)

| Classes of Events | Examples of events within each Class | Who could be directly impacted? | | | | | | | Political Insurance? | Regularly Recurring? | Concrete historical Examples |
|---|---|---|---|---|---|---|---|---|---|---|---|
| | | Equity Markers | Debt Markers | Commodities | Sovereign Dept. | Corporate financial assets | Corporate infrastructure/ plant | Corporate staff safety/ ability to operate | | | |
| Regime / government change | Elections and electoral outcomes | | | | | | | | No | Yes | In all "functional" democracies, where elections are judged as "free and fair" Japan 2007 |
| | Dissolution of cabinet or parliament | | | | | | | | No | No | US mid-term elections, 2006 |
| | Alternate partisan control of specific elected institution | | | | | | | | | | |
| | Divided government | | | | | | | | No | No | US: 2007-2009: Republican President Democratic Congress |
| Extra-electoral changes | Coup d'etats | | | | | | | | No | | Pakistan, Thailand |

Continued from FIG. 3C-1

FIG. 3C-3

Scoring Mechanism
- Does event have multiple and complex potential impacts on economic assets such as: FDI exposures, corporate and sovereign debt, equities, currencies, corporate staff, plant and financial assets.
- Are there similar historical precedents showing similar impacts for such events?

Low Score ⟶ High Score

360

| | A | B | C | D | E | F |
|---|---|---|---|---|---|---|
| 1 | Event Relevance Scoring Mechanism | | | *(Illustrative)* | | |
| 2 | Event Name | Event Class | Event Type | Score | Is Binary Call Market Relevant? | |
| 3 | US/Israeli Strike on Iranian Nuclear Facilities | International Warfare | Confirmed airstrike and other incursions | **** | Yes | |
| 4 | | | | | | |
| 5 | | | | | Event Hedgeable | |
| 6 | Assets impacted | Geographic Impact | Estimated magnitude of impact (given Geographic location) | Political Insurance for event class? | By Simple (Vanilla) Market | Historical precedents analogous events (write in event) |
| 7 | Equity Markets | Regional | Low | No | No | Yom Kippur War 1973 |
| 8 | Corporate Dept. Markets | Global | Medium | No | Yes | Iraq 2003, Yom Kippur War 1973 |
| 9 | Sovereign Debt Markets | Regional | Low | No | Yes | Osirak 1981, Iraq 2003, Yom Kippur War 1973 |
| 10 | Commodity Markets | Global | Catastrophic ▶ | | Yes | Yom Kippur War 1973 |
| 11 | Corporate financial assets | Country | Catastrophic / High / Medium / Low / Negligible | | No | Osirak 1981, Iraq 2003, Yom Kippur War 1973 |
| 12 | Corporate infrastructure/plant | Regional | | | No | Yom Kippur War 1973, Serbia-Kosovo 1998 |
| 13 | Corporate staff safety/ ability to operate | Regional | Catastrophic | Yes | No | Osirak 1981, Iraq 2003, Yom Kippur War 1973 |
| 14 | **** *Scoring weights/ thresholds still to be determined.* | | | | | |

Continued from FIG. 3C-1

| Weights Table | |
|---|---|
| Magnitude scores | Geographic Scores |
| Low = 10 | global = 1 |
| Medium = 30 | regional = .75 |
| High = 60 | country = .5 |
| Catastrophic =90 | sub-state = .25 |
| | Industry = .25 |

Fig. 3D

| Asset Class | Asset Score = max (geo score * mag score) | Geographic Impact | | | | Estimated Magnitude |
|---|---|---|---|---|---|---|
| | | Global | Regional | Country | Regional | Industry Specific | |
| Equity Markets | 90 (weighting factor: * 3) | 1 | 0.75 | 0.5 | 0 | 0.25 | 90 |
| Corporate Debt Markets | 30 (weighting factor: * 3) | 1 | 0.75 | 0.5 | 0.25 | 0.25 | 30 |
| Sovereign Debt Markets | 10 (weighting factor: * 3) | 1 | 0.75 | 0.5 | 0.25 | 0 | 10 |
| Commodity Markets | 90 (weighting factor: * 3) | 1 | 0.75 | 0.5 | 0.25 | 0.25 | 90 |
| Corporate Financial Assets | 60 | 0 | 0.75 | 0.5 | 0.25 | 0.25 | 60 |
| Corporate Infrastructure/Plant | 90 | 0 | 0.75 | 0.5 | 0.25 | 0.25 | 90 |
| Corporate Staff Safety/Ability to Operate | 90 | 0 | 0.75 | 0.5 | 0.25 | 0.25 | 90 |
| Total Impact Score | 129 | | | | | | |

Fig. 3E

| Classes of Events 602 | Examples of Events Within Each Class 604 | Who could be directly impacted? 606 | | | | | | | Political Insurance? 608 | Regularly Recurring? 610 | Examples 612 |
|---|---|---|---|---|---|---|---|---|---|---|---|
| | | Equity Markets | Debt Markets | Commodities | Sovereign Debt | Corporate Financial Assets | Corporate Infrastructure/plant | Corporate staff safety/ability to operate | | | |
| Regime/ government change | | | | | | | | | | | |
| | Elections and electoral outcomes | ✓ | | | | | | | No | Yes | In all "functional" democracies, where elections are judged as "free and fair" |
| | Dissolution of cabinet of parliament | ✓ | ✓ | ✓ | ✓ | | | | No | No | Japan 2007 |
| | Alternate partisan control of specific elected institution | ✓ | ✓ | ✓ | ✓ | | | | No | No | US mid-term elections, 2006 |
| | Divided government | ✓ | ✓ | ✓ | ✓ | | | | No | No | US: 2007-2009: Republican President, Democratic Congress |
| Extra-electoral changes | | | | | | | | | | | |
| | Coup d'etats | ✓ | ✓ | ✓ | ✓ | ✓ | ✓ | ✓ | No | | Pakistan, Thailand |
| | Presidential Impeachment | ✓ | ✓ | ✓ | ✓ | | | | No | | Romania, 2007 |
| | Government resignations (unconnected to elections) | ✓ | ✓ | ✓ | ✓ | | | | No | | Czech Republic, 2008 |
| | Declarations of Independences/recognitions of independence | ✓ | ✓ | ✓ | ✓ | ✓ | ✓ | ✓ | No | | Timor, Kosovo, Montenegro |

FIG. 6A

| Classes of Events 602 | Examples of Events Within Each Class 604 | Who could be directly impacted? 606 ||||||| Political Insurance? 608 | Regularly Recurring? 610 | Examples 612 |
|---|---|---|---|---|---|---|---|---|---|---|---|
| | | Equity Markets | Debt Markets | Commodities | Sovereign Debt | Corporate Financial Assets | Corporate Infrastructure/plant | Corporate staff safety/ability to operate | | | |
| Policy Change | Regulatory environment change | ✓ | ✓ | ✓ | ✓ | ✓ | ✓ | | Some | No | US: Sarbanes Oxley |
| | Policy expirations | ✓ | ✓ | ✓ | ✓ | ✓ | ✓ | ✓ | No | Yes | Bush administration tax cuts |
| | Tax system change | ✓ | ✓ | ✓ | ✓ | ✓ | ✓ | ✓ | Some | No | Flat tax adoption in Russia, Ukraine, etc. |
| | Expropriations/ Nationalizations | ✓ | ✓ | ✓ | ✓ | ✓ | ✓ | ✓ | Yes | No | Venezuela: Old Industry |
| | Currency controls/ repatriation of profit | ✓ | ✓ | ✓ | ✓ | ✓ | ✓ | | Yes | No | Malaysia 1997 |
| | Government frustration/ repudiation of economic contract | ✓ | ✓ | ✓ | ✓ | ✓ | ✓ | ✓ | Yes | No | India and Enron's Dabhol Plant |
| International Politics | Currency coordination or unions | ✓ | | ✓ | ✓ | ✓ | | | No | No | Eastern European states adopt the euro |
| | Trade agreements through bilateral FTAs | ✓ | ✓ | ✓ | ✓ | ✓ | ✓ | ✓ | Yes | Yes | NAFTA expansion |
| | Multilateral trade agreement (WTO) | ✓ | ✓ | ✓ | ✓ | ✓ | ✓ | ✓ | Yes | Yes | China accession |

FIG. 6B

| Classes of Events 602 | Examples of Events Within Each Class 604 | Who could be directly impacted? 606 | | | | | | | Political Insurance? 608 | Regularly Recurring? 610 | Examples 612 |
|---|---|---|---|---|---|---|---|---|---|---|---|
| | | Equity Markets | Debt Markets | Commodities | Sovereign Debt | Corporate Financial Assets | Corporate Infrastructure/plant | Corporate staff safety/ability to operate | | | |
| | Formulization/break-up of international treaties | ✓ | ✓ | ✓ | ✓ | ✓ | ✓ | ✓ | | | |
| | Ascession to international treaty | ✓ | ✓ | ✓ | ✓ | ✓ | ✓ | ✓ | Yes | No | Eastern European states in EU, NATO |
| | Imposition of economic/financial sanctions | ✓ | ✓ | ✓ | ✓ | ✓ | ✓ | ✓ | Yes | Some | US sanctions on Burma |
| Civil Violence | | | | | | | | | | | |
| | Acts of Terrorism | ✓ | ✓ | ✓ | ✓ | ✓ | ✓ | ✓ | Yes | No | 9/11, Madrid bombings |
| | Civil War | ✓ | ✓ | ✓ | ✓ | ✓ | ✓ | ✓ | Yes | No | Bosnia 1991-1995 |
| | Violent civil unrest | ✓ | ✓ | ✓ | ✓ | ✓ | ✓ | ✓ | Yes | No | Indonesia, 1998 |
| | Industrial Strikes | | | | ✓ | ✓ | ✓ | ✓ | Some | No | NYC, Transit strike 2009 |
| International Warfare | | | | | | | | | | | |
| | Declaration of War | ✓ | ✓ | ✓ | ✓ | ✓ | ✓ | ✓ | Yes | No | Eritrea v. Ethiopia |
| | Naval Blockade | ✓ | ✓ | ✓ | ✓ | ✓ | ✓ | ✓ | Yes | No | Iraq, 1991 |
| | Confirmed airstrikes and other incursions | ✓ | ✓ | ✓ | ✓ | ✓ | ✓ | ✓ | Yes | No | Kosovo, 1998 |
| | Confirmed Invasions of Sovereign State | ✓ | ✓ | ✓ | ✓ | ✓ | ✓ | ✓ | Yes | No | Israel in Lebanon, 2006 |

FIG. 6C

| Classes of Events 602 | Examples of Events Within Each Class 604 | Who could be directly impacted? 606 | | | | | | | Political Insurance? 608 | Regularly Recurring? 610 | Examples 612 |
|---|---|---|---|---|---|---|---|---|---|---|---|
| | | Equity Markets | Debt Markets | Commodities | Sovereign Debt | Corporate Financial Assets | Corporate Infrastructure/plant | Corporate staff safety/ability to operate | | | |
| One-off Events | | | | | | | | | | | |
| | Epidemics/Pandemics | ✓ | ✓ | ✓ | ✓ | ✓ | ✓ | ✓ | No | | Possible avian flu outbreak |

FIG. 6D

Event Sheet

| Event name | <One sentence headline> |
|---|---|
| Timing of Event | |
| Location of Event | <Enter Date> |
| Explanation of Event (80 words) | <Describe what the event is> |
| Proof of Event Occurring | <What is the specific evidence that will determine that the event has or has not occurred> |
| Arbiter of Event Occurring | <What is the specific entity or organization that will determine that the event has or has not occurred> |

← 702
← 704
← 706
← 708
← 710
← 712

Event Characteristics   (Optional Section)

Which of the following characteristics define the event? Choose as many as apply. In order to have a specific call that is defensible, please define any characteristics, such as magnitude, location and parties involved that would better describe the call.

| | Choose Event Characteristics Type (Drop-down list) | Description of Characteristics | Arbiter or Evidence of Facts |
|---|---|---|---|
| 1 | ... | | |
| 2 | ... | | |
| 3 | ... | | |
| 4 | ... | | |
| 5 | ... | | |

Impact of Event

Who do you expect to be impacted by this event? Choose as many as apply from the drop-down list. By filling this section, you will allow better understanding of client interest in this future event.

|   | Type of Impact (Drop-down list) | Description of Impact (one sentence each) Specify which market(s) or entities will be impacted | Evidence of Impact (If applicable) |
|---|---|---|---|
|   | Choose as many as apply from drop-down list | | |
| 1 | ... | | |
| 2 | ... | | |
| 3 | ... | | |
| 4 | ... | | |
| 5 | ... | | |

← 716

Assumptions

List any assumptions/Caveats that would invalidate the call. For instance, if the event is an election, and the outcome of the election is civil war or the declaration of a rival parliament.

|   | Main Assumptions | Enter list of other events or issues that would invalidate the call | Evidence of Event Becoming Invalid (If applicable) |
|---|---|---|---|
| 1 | Event becomes invalid if: | | |
| 2 | Event becomes invalid if: | | |
| 3 | Event becomes invalid if: | | |
| 4 | Event becomes invalid if: | | |
| 5 | Event becomes invalid if: | | |

Further Explanation of the Event

| | | |
|---|---|---|
| Is the Event a Proxy for Another Political Event? | <Please explain if this event was chosen as a proxy for another political event> | ← 720 |
| Causes of Event | <If necessary to understanding the call, list its main causes or entities causing the event> | ← 722 |
| Impact of Event | <To better understand the event, briefly list who do you think will be impacted by this event. Choices can include Equity Markets, Credit Markets, FDI, Commodities Markets or specific Government and Corporate Entities. Please list all that apply> | ← 724 |

| | | Rational Choice | Qualitative Assessments | Pairwise Comparison Methods (AHP) | Historical Data Estimates |
|---|---|---|---|---|---|
| Regime / government change | | | | | |
| | Elections and electoral outcomes | x | x | x | x |
| | Dissolution of cabinet or parliament | x | x | x | x |
| | Alternate partisan control of specific elected institutions | x | x | x | x |
| | Divided government | x | x | x | x |
| Extra-electoral changes | | | | | |
| | Coup d'etats | | x | x | x |
| | Presidential Impeachment | | x | x | x |
| | Government resignations (unconnected to elections) | | x | x | x |
| | Declarations of independence / recognitions of independence | | x | x | |
| Policy Changes | | | | | |
| | Regulatory environment change | x | x | x | x |
| | Policy expirations | x | x | x | |
| | Tax system change | x | x | x | x |
| | Expropriations/Nationalizations | x | x | x | x |
| | Currency controls/repatriation of profit restrictions | | x | x | x |
| | Government frustration/repudiation of economic contract | x | x | x | |

To FIG. 8 Continued

From FIG. 8

| | | | | | |
|---|---|---|---|---|---|
| International Politics | | | | | |
| | Currency coordination or unions | | x | x | |
| | Trade agreements through bilateral FTAs | x | x | x | x |
| | Multilateral trade agreement (WTO) | | x | x | |
| | Formalization/ break-up of international treaties | x | x | x | |
| | Asccession to international treaty | x | x | x | |
| | Imposition of economic/ financial sanctions | x | x | x | x |
| Civil Violence | | | | | |
| | Acts of Terrorism | x | x | x | x |
| | Civil War | x | x | x | x |
| | Violent civil unrest | x | x | x | x |
| | Industrial strikes | x | x | x | x |
| International Warfare | | | | | |
| | Declarations of War | x | x | x | x |
| | Naval Blockade | x | x | x | x |
| | Confirmed airstrikes and other incursions | x | x | x | x |
| | Confirmed invasions of Sovereign State | x | x | x | |
| One-Off Events | | | | | |
| | Epidemics / Pandemics | x | x | x | |

FIG. 8 Continued

Trader No.: 5557272

| Contract No. | Contract Brief Description | Bid Qty | Bid | Ask | Ask Qty | Last |
|---|---|---|---|---|---|---|
| 47652 | US/Israeli strike against Iran nuclear | 10 | 32 | 35 | 5 | 5@32 |
|  |  | 25 | 31 | 36 | 15 |  |
|  |  | 20 | 29 | 37 | 50 |  |
| 98564 | US reductions on Ethanol import tariffs | 5 | 49 | 52 | 7 | 7@50 |
|  |  | 12 | 47 | 54 | 22 |  |
|  |  | 70 | 46 | 55 | 30 |  |
| 74926 | Taiwan to join UN under name Taiwan | 7 | 26 | 31 | 10 | 15@30 |
|  |  | 15 | 24 | 35 | 15 |  |
|  |  | 20 | 20 | 38 | 35 |  |

↙ 1702

| Contract | Brief Description | Bid/Ask | Price | Quantity |  |
|---|---|---|---|---|---|
| 47652 | US/Israeli strike | Bid | 29 | 15 | Model |
| 74926 | Taiwan to join UN | Ask | 31 | 10 | Model |

↗ 1704

↙ 1706

Contract [▸]

Price [    ]

Quantity [    ]

[Model]   [Sell]

[Buy]

| Contract No. | Contract Brief Description | Buy/Sell | Status | Quantity | Price | Time |
|---|---|---|---|---|---|---|
| 47652 | US/Israeli strike against Iran nuclear | Buy | Pending | 15 | 29 | |
| | | Buy | Completed | 10 | 36 | 12:07:42 |
| | | Buy | Completed | 10 | 36 | 12:42:12 |
| 98564 | US reductions on Ethanol import tarifts | Buy | Completed | 5 | 50 | 11:07:17 |
| | | Buy | Completed | 20 | 51 | 11:05:16 |
| | | Sell | Completed | 10 | 54 | 15:16:12 |
| 74926 | Taiwan to join UN under name Taiwan | Sell | Pending | 10 | 31 | |
| | | Sell | Completed | 5 | 30 | 10:14:31 |
| | | Sell | Completed | 5 | 30 | 10:57:16 |

1802

SYSTEM AND METHOD FOR DEFINING, STRUCTURING, AND TRADING POLITICAL EVENT CONTRACTS

BACKGROUND OF THE INVENTION

Political event contracts are typically bilateral financial agreements pursuant to which one party agrees to pay a second party a fixed sum of money in the event that a triggering political event specified in the contract occurs. For example, the first party may agree to pay the second party one thousand dollars ($1000) in the event that a specified election is won by a specified candidate. If the specified candidate prevails in the election, the contract is said to settle at one thousand dollars ($1000) and the first party pays that amount to the second party. If, by contrast, the candidate loses the election, the contract is said to settle at zero dollars ($0) and no payment is made by the first party to the second party.

Once a political event contract is defined, it may be listed on an exchange and traded by persons or entities wishing to hedge against risks that they encounter in connection with their primary activities which correlate to the underlying event used to define the contract. For example, a company doing significant business in a specified foreign country may wish to hedge against the risk that its business will decrease if there is a military coup in that foreign country. If a political event contract is available that pays one thousand dollars ($1000) in the event of such a military coup, the company can hedge as much or as little of the risk it perceives from the coup by purchasing as many contracts in the market as it deems sufficient or appropriate.

A market for political event contracts may also include speculators. Speculators are market participants who try to profit from buying and selling contracts by anticipating future price movements. Speculators benefit such a market by assuming price risk and adding depth and liquidity to the market.

Political event contracts are today listed and traded on a number of internet marketplaces such as on the internet marketplace operated at www.intrade.com. The intrade marketplace describes itself as an exchange at which traders may express a view on a wide variety of world events by buying and selling event contracts at published prices. Contracts on the intrade exchange are divided into six event categories: politics, entertainment, financial indicators, weather, current events, and legal affairs. Further information concerning the intrade exchange is available at the company's website address above.

In the United States, the operation of marketplaces or exchanges such as that provided by intrade raises significant legal and regulatory concerns. In May 2008, the Commodity Futures Trading Commission (CFTC) solicited public comments on the appropriate regulatory treatment for event contracts. See 73 Fed. Reg. 25669-74 (May 7, 2008). One significant concern voiced by the CFTC was how to address the potential gaming aspects of some contracts which may not satisfy any real economic purpose, but instead merely provide a mechanism for wagering on events of general interest. Listing of such contracts on financial exchanges could convert such exchanges to surrogate gambling venues counter to public policy.

In addition to these regulatory concerns, defining and trading political event contracts on an established financial exchange in the United States present certain practical problems. For example, because the number of potential political events from around the world that can be used as the basis for defining a political event contract is immense, it is difficult to determine which particular events should be selected to maximize the economic value of the contract and its use as a hedging vehicle by market participants. Contracts that do not provide sufficient economic value as a hedging mechanism are not likely to attract significant liquidity, making such contracts less viable and ultimately less profitable for the listing exchange.

There is therefore a need in the art for a system and method for defining, structuring, and trading political event contracts that are of significant economic value so as to maximize trading in the contracts and the likelihood that they will receive regulatory approval for trading on regulated exchanges, rather than being deemed to represent simple gambling.

SUMMARY OF THE INVENTION

A system and method for defining, structuring, and trading political event contracts is disclosed. The system and method implement a systematic process for defining political event contracts that provide a hedging or insurance alternative for political events with significant and complex impacts on investors and reflect more than mere speculation. In a preferred embodiment, the systematic process comprises a rigorous taxonomy of risk event classes that delimit the types of contracts to be defined.

Apparatus for implementing the systematic process of the present invention is also disclosed. In a preferred embodiment, this apparatus comprises an event relevance scoring mechanism to determine whether a derivative instrument embodying a specified event is economically warranted and useful to the marketplace as a mechanism for hedging risks not easily addressed through other market tools.

The disclosed apparatus further comprises apparatus for modeling the value of a specified political event contract. In a preferred embodiment, the modeling captures both rational and intuitive analysis about an event using criteria based decision trees to provide highly structured calculation of relative probabilities. The tree components are weighted and compared by an analyst or other user to determine probabilities for various alternative outcomes to a specified political event.

In one aspect, the present invention is directed to a computer implemented system for defining and structuring political event contracts, comprising an event relevant scoring mechanism. In another aspect, the event relevant scoring mechanism is adapted to evaluate event proposals submitted by an analyst to measure the market relevance of the event proposals. In another aspect, the event relevant scoring mechanism is adapted to determine whether: (i) an event proposal is part of an event class typology set; (ii) there exists political risk insurance for the event that is the subject of the event proposal; and (iii) the event that is the subject of the event proposal is hedgeable by an existing financial product.

In another aspect, the system is adapted to reject an event proposal where the event that is the subject of the event proposal is not part of the event class typology set. In yet another aspect, the system is adapted to accept the event for further definition and structuring where there exists political risk insurance for the event that is the subject of the event proposal. In yet another aspect, the system is adapted to accept the event for further definition and structuring where the subject of the event proposal is hedgeable by an existing financial product.

In another aspect, the event relevant scoring mechanism comprises a scoring component adapted to calculate a total impact score for a proposed political event reflecting the economic significance of the event. In yet another aspect, the total impact score is determined as a function of one or more impact values and one or more geographic values. In yet another aspect, the system is adapted to reject an event proposal where the total impact score fails to exceed a predetermined threshold and accept the event for further definition and structuring where the total impact score exceeds a predetermined threshold.

In another aspect, the system comprises an event definition component adapted to maintain event definition information. In yet another aspect, the event definition information may include one or more of the following: whether the event that is the subject of the event proposal is divisible into two or more mutually exclusive outcomes, the key details or features of the event that is the subject of the event proposal, a timing of the event that is the subject of the event proposal, a location of the event that is the subject of the event proposal, a proof of occurrence of the event that is the subject of the event proposal, and an arbiter of the event that is the subject of the event proposal.

In another aspect, the system comprises a modeling component adapted to model the probability of occurrence of the event that is the subject of the event proposal. In yet another aspect, the modeling component comprises a pair-wise comparison modeling tool.

In another aspect, the present invention is directed to a system for trading a political event contract, comprising a matching engine for matching buy and sell orders for the political event contract. In yet another aspect, the political event contract is selected through a systematic selection and definition process to have market relevance. In yet another aspect, the system comprises a mark-to-model component adapted to model the value of the political event contract.

BRIEF DESCRIPTION OF THE DRAWINGS

FIGS. 3B and 3C illustrate a preferred embodiment for implementing an event relevance scoring mechanism;

FIGS. 3D and 3E illustrate a preferred embodiment of how weighted factors may be used to calculate a total impact score for a proposed political event reflecting the event's economic significance;

FIGS. 6A-D illustrates a preferred embodiment for creating a typology of political events;

FIGS. 7A-B illustrate a preferred embodiment of an event sheet suitable for defining the parameters of an event to be used as the basis of a political event contract;

FIG. 7C illustrates a preferred embodiment of a supplemental table that may be provided for the event sheet template to allow further explanation of an event by an analyst;

FIG. 8 is a chart illustrating methodologies best suited for evaluating different political event types;

FIG. 17 illustrates an exemplary embodiment of a trading screen which may preferably form part of a user interface of a trading terminal; and FIG. 18 illustrates an exemplary embodiment of a blotter screen which may preferably form part of a user interface of a trading terminal.

DETAILED DESCRIPTION OF THE PREFERRED EMBODIMENTS

Figure 1:
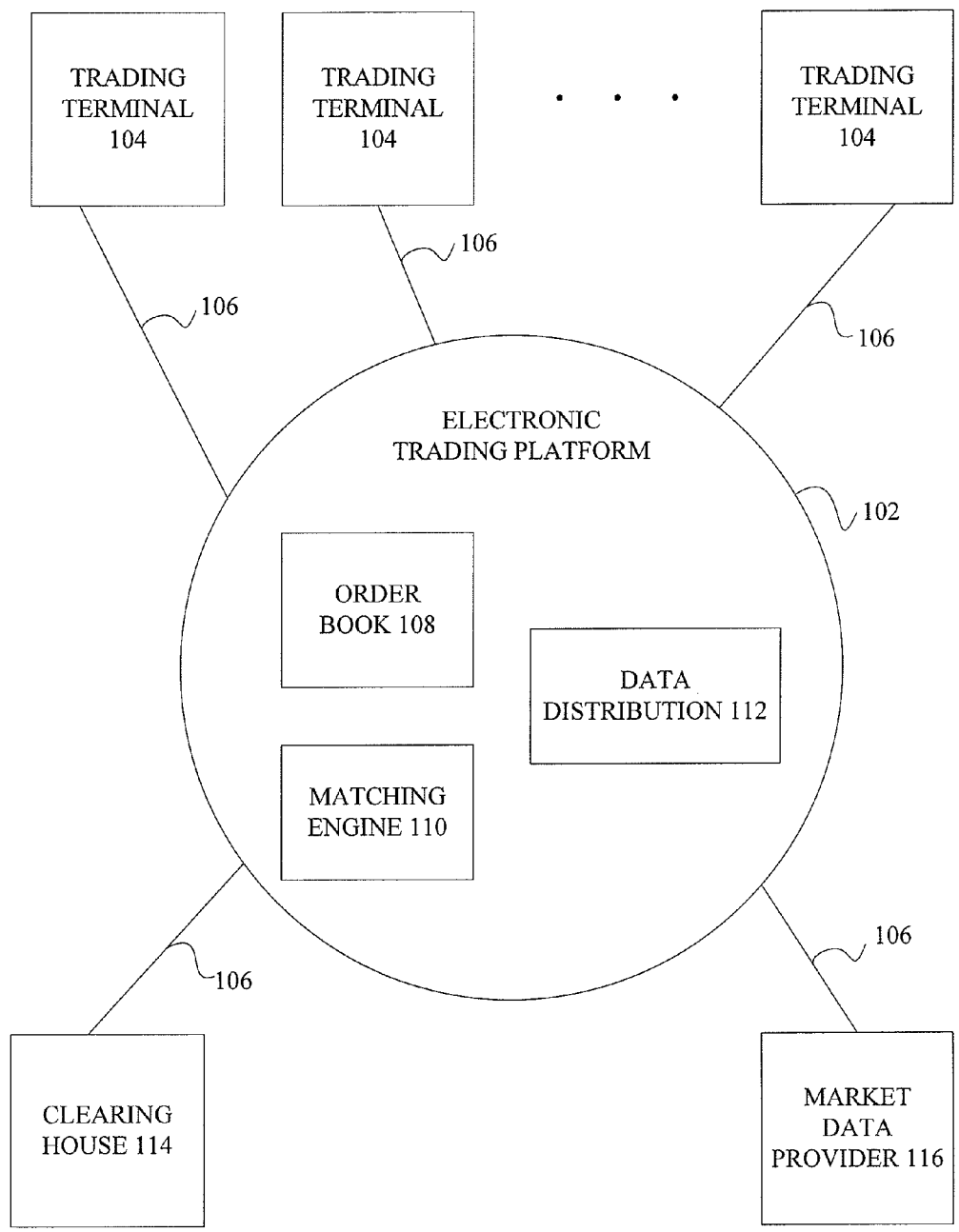
FIG. 1 is a block diagram of a trading system suitable for trading political event contracts in accordance with a preferred embodiment of the present invention.

Preferred embodiments for implementing the present invention will now be described with reference to the Figures. Beginning with FIG. 1, there is shown a preferred embodiment of a system architecture for trading political event contracts. As shown in FIG. 1, the system architecture preferably comprises an electronic trading platform 102 and a plurality of trading terminals 104. Electronic trading platform 102 is adapted to communicate with trading terminals 104 via one or more suitable communications connections 106, which may be provided, for example, via the internet, virtual private networks, or direct communication lines.

Electronic trading platform 102 preferably comprises one or more processors and storage media suitable for implementing the architecture and processing described below. In particular, as shown in FIG. 1, electronic trading platform 102 preferably comprises processors and storage media for implementing an order book 108 adapted to store buy and sell orders submitted by traders at trading terminals 104. Order book 108 is preferably in linked communication with a matching engine 110 adapted to match buy and sell orders from order book 112 in accordance with specified trading rules promulgated by the exchange or other entity that operates electronic trading platform 102.

Order book 108 and matching engine 110 are each in linked communication with a data distribution engine 112. Data distribution engine 112 is adapted to process information relating to pending buy and sell orders received from order book 108 and completed transactions received from matching engine 110 and to format this information for distribution to different parties.

For example, information regarding completed transactions will typically be reported by data distribution engine 112 to a clearinghouse 114. Clearinghouse 114 uses the information to clear the completed transactions by becoming the buyer to every seller and the seller to every buyer of a contract traded via electronic trading platform 102. This breaks the contractual privity between the buyer and seller, making it possible for each side of the trade to close out its position without relocating its original counterparty to undo the trade, but simply by executing an offsetting transaction in the market.

Clearinghouse 114 may also use this information regarding completed transactions to mark to market the positions of different clearinghouse members to determine the amount of the guaranty deposit that must be posted by each clearinghouse member for use in the event that the member defaults to cover any potential losses. It should also be noted that not every entity wishing to trade on electronic trading platform 102 need be a member of clearinghouse 114. Non-members wishing to trade via the platform may do so by establishing an account with a member of the clearinghouse. The clearinghouse member will, in turn, establish margin requirements for its non-member customers, to protect against losses to the member in the event of default by a non-member customer.

Data distribution engine 112 will also typically forward price and other information concerning completed transactions and pending buy and sell orders to one or more market data providers, such as market data provider 116 shown in FIG. 1. Market data provider 116 typically sells both real-time and historical market data to third parties in the marketplace.

Order book 108, matching engine 110, and data distribution engine 112 of electronic trading platform 102 may be implemented using software running on a suitable hardware configuration. Alternatively or in addition, aspects of the electronic trading platform may be implemented using other electronic components such as special purpose processors and firmware. It will further be recognized that electronic trading platform 102 may be implemented on one or more computer processors in localized or distributed data centers, which may include suitable redundant and disaster-recovery data centers.

Each trading terminal 104 may preferably be a computer workstation comprising a CPU, memory, display, and input devices, such as a mouse and keyboard. Trading terminals 104 are preferably used by traders to transmit orders to buy or sell specified financial instruments including political event contracts and to receive transaction confirmations and market data concerning such contracts for display to the trader.

Figure 2:
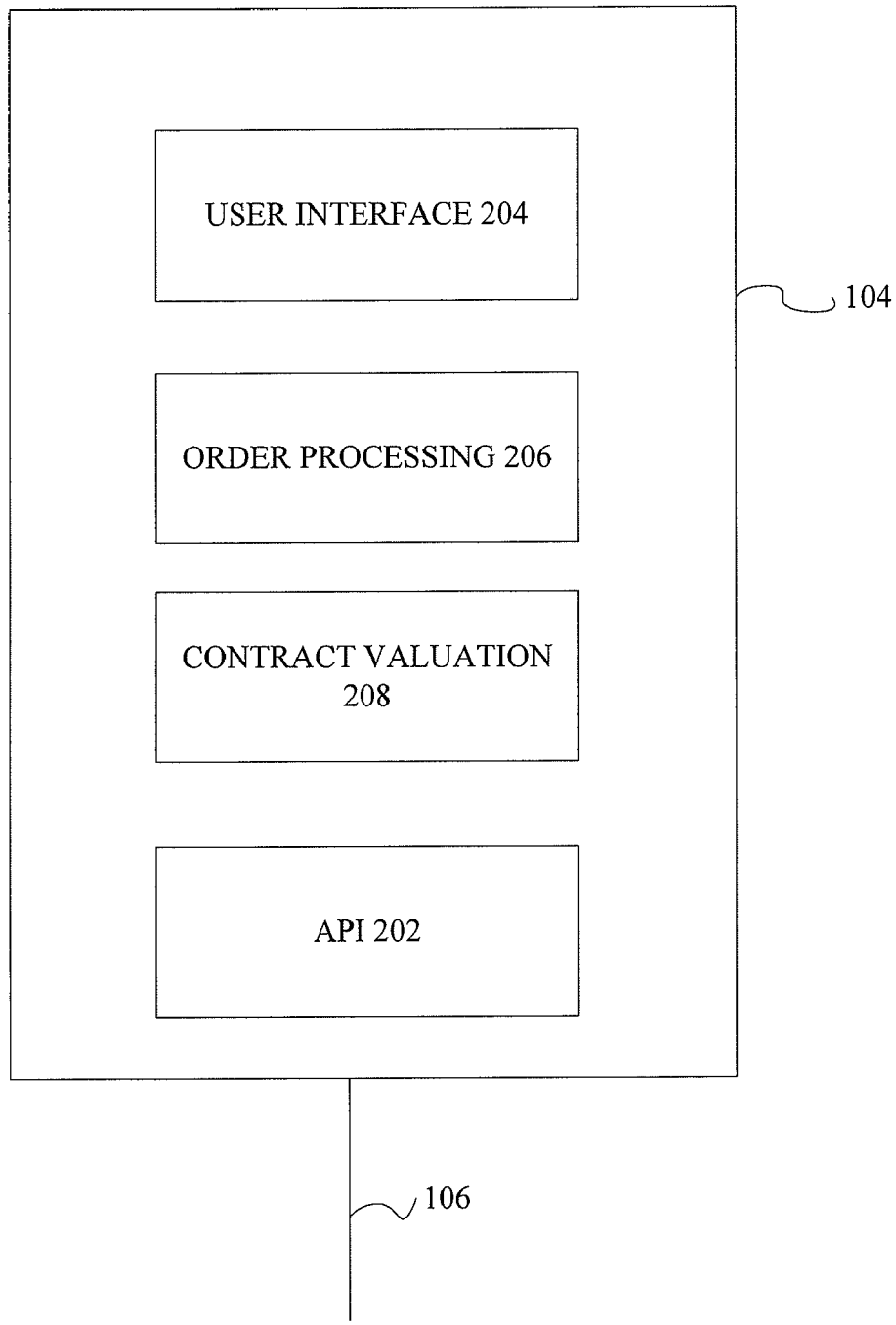
FIG. 2 is a block diagram illustrating the components of a trading terminal in a preferred embodiment of the present invention.

As shown in FIG. 2, trading terminals 104 may typically communicate with and access the functionality of electronic trading platform 102 via an application programming interface (API) 202, published or otherwise made available by the entity that operates electronic trading platform 102. Trading terminals 104 further preferably comprise a user interface component 204 adapted to selectably display different screens to a trader at the trader's option.

One such screen may be a trading screen adapted to display pending buy and sell orders in the market for political event contracts and to permit a trader to transact against such orders or submit additional buy or sell orders to electronic platform 102 at trader configurable prices and quantities. An exemplary trading screen for providing the above functionality which may form part of user interface 204 is described below in connection with FIG. 17.

A second screen available for display to traders may be a blotter that displays to a trader all of the trader's pending positions in the market as well as summary information concerning the trader's completed trades. An exemplary blotter screen for providing the above functionality which may form part of user interface 204 is described below in connection with FIG. 18. Information for populating the trader's blotter may be stored by an order processing component 206, resident in the trader's trading terminal 104. Order processing component 206 may also comprise tools for aiding the trader in analyzing the trader's market positions and preparing orders for submission to electronic trading platform 102.

Trading terminals 104 are also preferably provided with a contract valuation module 208 adapted to facilitate evaluation of the value of political event contracts and to permit traders to model for themselves the value they attribute to such contracts as a function of a number of underlying parameters. Preferred embodiments for implementing contract valuation in accordance with the present system and method will be described in more detail below.

Figure 3A:
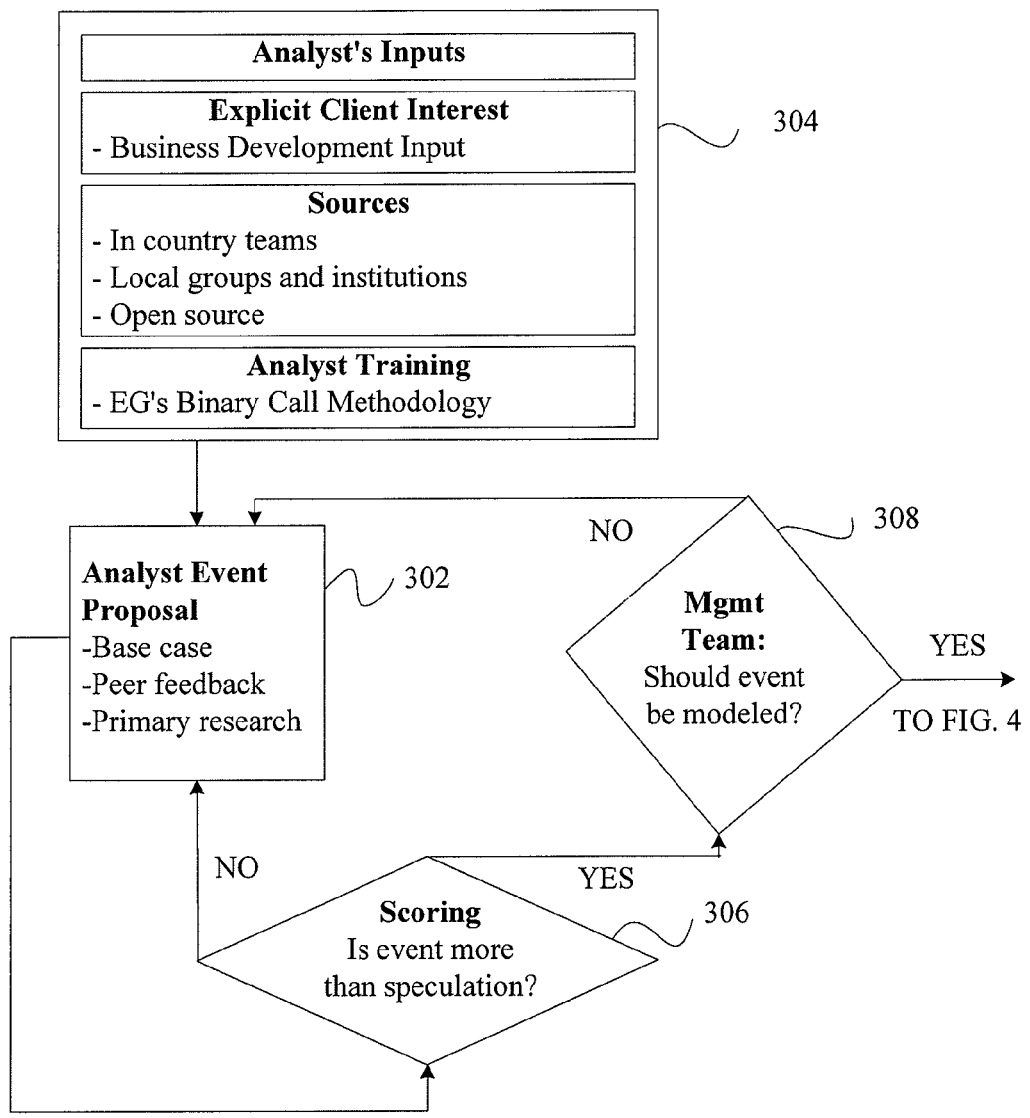
FIG. 3A is a flow chart illustrating a process for initial selection of political events in accordance with a preferred embodiment of the present invention.
Figure 4:
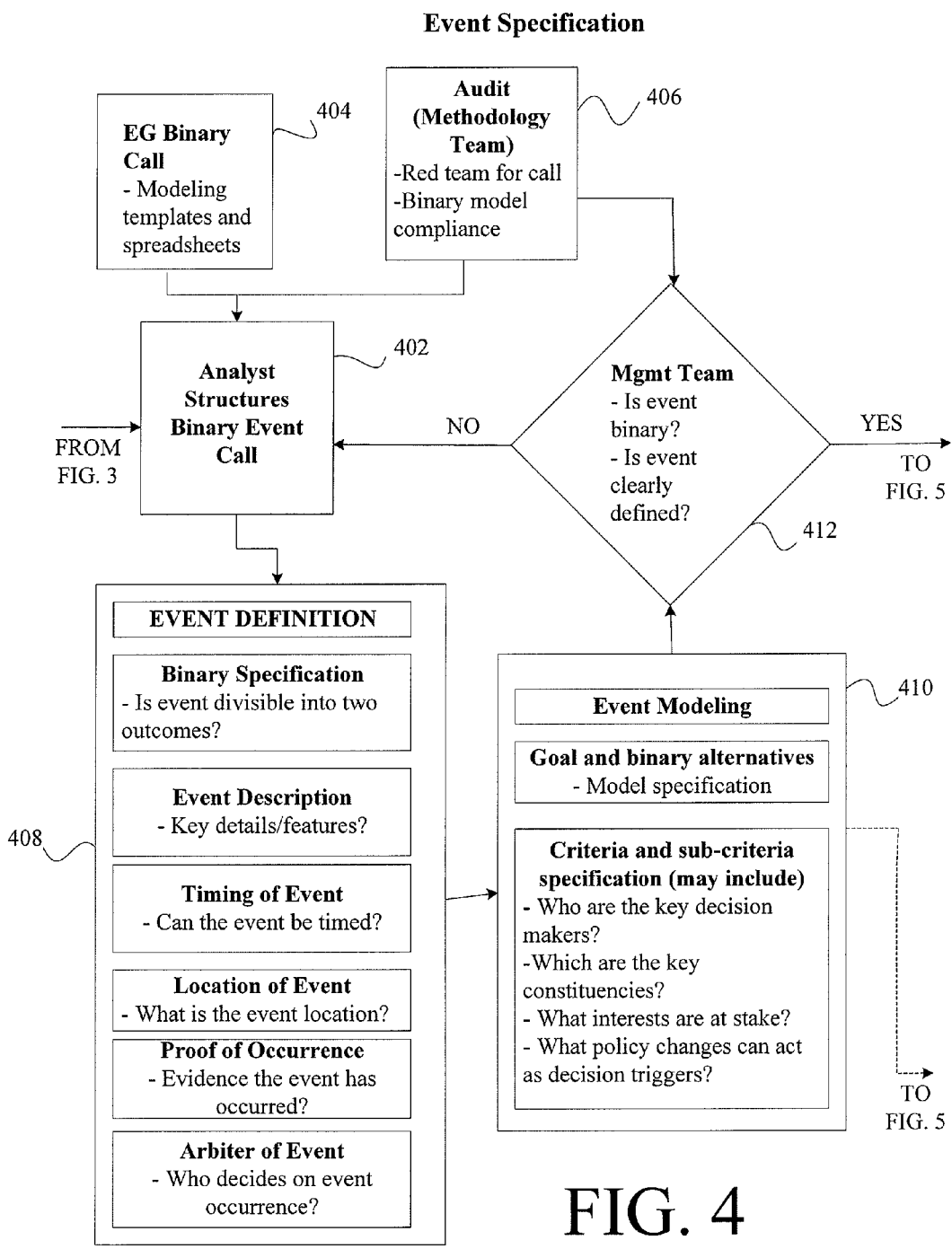
FIG. 4 illustrates a preferred embodiment for specifying in detail the terms of an event to be used in defining a political event contract.
Figure 5:
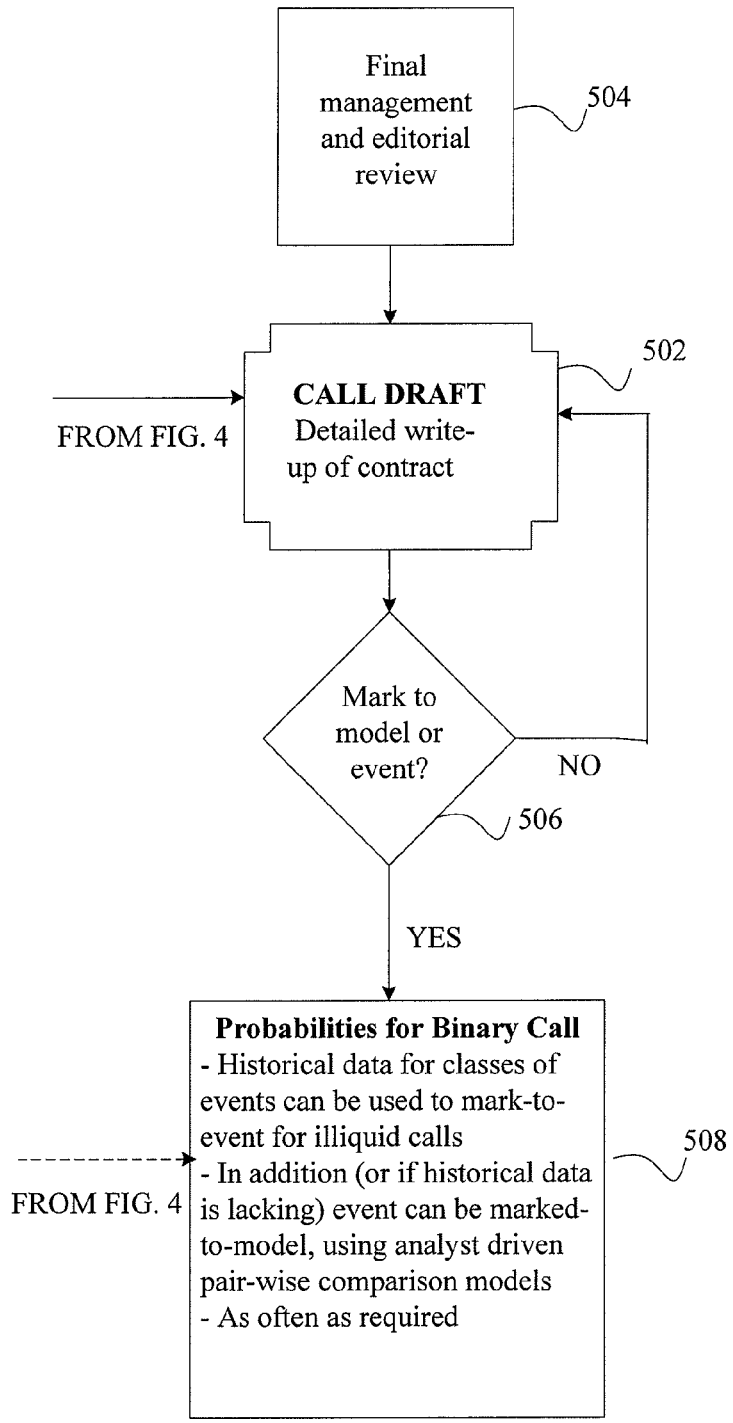
FIG. 5 illustrates a preferred embodiment of a process for conducting final review and probability assignment for a proposed political event contract.

FIGS. 3-5 are flow charts illustrating preferred embodiments of a process for creating a political event contract suitable for trading via electronic trading platform 102. As shown in FIG. 3A, at Step 302, particular events are selected as likely candidates for use in defining political event contracts. In one preferred embodiment, the initial selection of potential events may be made by an analyst or committee of analysts.

As will be recognized, the number of events and potential events occurring daily around the world that may potentially be suitable as the subject of a political event contract is enormous. Consequently, in some preferred embodiments, an early step in the process of creating such a contract is preferably to utilize the expertise of one or more analysts to separate out particular events or classes of events from this enormous number that are likely to reflect significant political and economic impact. This may be based on a pre-defined typology of political risk events that defines both broad classes of political events (e.g., Domestic electoral changes, extra-electoral government changes, policy changes, international warfare, etc.) and specific types of events within the event classes. One embodiment of such a typology will be described below in connection with FIGS. 6A-D. In selecting possible events for use in contract formation, the analysts may preferably review and consider information drawn from base cases, peer feedback, and primary research. In addition, as shown at Step 304, analysts may draw from a variety of sources to gather information useful in identifying potential events of interest, including information collected and provided by in-country teams, local groups and institutions, and publicly available information.

It should further be recognized that political event analysts, although very knowledgeable regarding underlying facts and conditions in particular countries and geographic regions, and the political significance of such facts and conditions, may not have a specific background in financial trading or development of derivative instruments. Accordingly, as also shown at Step 304, the analysts tasked with creating political event contracts are preferably trained with respect specifically to identifying and defining suitable events for constructing political event contracts in accordance with the methodology described herein.

In an alternative preferred embodiment, the initial selection of events as likely candidates for use in defining political event contracts may be implemented algorithmically using a programmed computer system adapted to apply quantitative filtering techniques to the event selection process. A preferred embodiment for implementing such an algorithm will now be described in connection with Table 1 below.

TABLE 1

| Political Risk Events Classes (Illustrative) | Identified states at risk (Illustrative) |
| --- | --- |
| International War | North Korea v. South Korea |
|  | Israel v. Iran |
|  | Eritrea v. Ethiopia |
| Expropriation (non-creeping) | Venezuela, Zimbabwe, Malawi, Russia |
| Non-constitutional government change | Thailand, Turkey, Togo |

As shown in Table 1, the algorithm divides potential political risk events into a number of predefined classes. In the example illustrated in Table 1, the defined classes are: International War, Expropriation (non-creeping), and Non-constitutional Government Change. It should be recognized, however, that additional or different classes may be selected to characterize the universe of relevant political risk events.

Once classes of political events are defined, data driven models and criteria may then be applied for each event class to all states in the world to identify those states at risk for the event. Thus, for example, programmed algorithms may be applied to identify those states having the highest probability of going to war by implementing a quantitative analysis based on historical data that model a country's propensity for violence. This data may, for example, include data concerning previous actions in the last 10 years, size of standing army, military budget, type of regime, and similar parameters for the country's neighbors. Such an analysis permits the potential zones of international conflict to be narrowed to a handful of states or regions around the world. In the illustrative example of Table 1, the identified states at risk for the class of "International War" are North Korea v. South Korea, Israel v. Iran, and Eritrea v. Ethiopia.

Once a group of potential political risk events has been initially selected (whether by an analyst or automated algorithm), the next step in the event selection process is to determine whether the identified events are market relevant. As will be recognized, not all international conflicts or other events will have significant economic or financial impact. For example, while a war involving Iran may be expected to have major destabilizing effects on various aspects of the international economy, wars involving other countries such as Eritrea may not. Accordingly, to maximize the likelihood that modeling of a particular event will provide a useful economic derivative, and will not represent mere speculation or gambling, a model that identifies the economic impact of each proposed event, including by identifying the size of the relevant regional economy, capital markets, and FDI flows and strategic trade routes is preferably used to narrow the range of potential events and select only those with market relevance.

In particular, in step 306, each of the initially selected potential events is evaluated by an event relevance scoring mechanism (ERSM) to determine whether a derivative instrument embodying the event is economically warranted and useful to the marketplace as a mechanism for hedging risks not easily addressed through other market tools. The ERSM may be implemented in software running on suitable computer hardware using known computer programming techniques.

A preferred embodiment for implementing an ERSM will now be described in connection with FIGS. 3B and 3C. FIG. 3B illustrates an event relevance template that organizes information regarding specified political events. As shown in FIG. 3B, a template 320 preferably identifies each event by event name (field 322), by event class (field 324), and by event type (field 326). The template further comprises fields 328, 330 for storing a numerical score and Boolean value representing the market relevance of the particular event. Preferred embodiments for determining such a numerical score and Boolean value are described below.

In addition, template 320 stores information concerning each type of asset class that may be impacted by the event (field 332), and the estimated magnitude (field 334) and scope (field 336) of such impact on each such asset class. It further stores information for each asset class regarding whether political risk insurance is available to insure against risks associated with the event (field 338) and whether there exist alternative "vanilla" market transactions that can hedge against the event's impact (field 340). The information stored in template 320 may be maintained in a suitable database for processing by a computer system implementing the process shown in FIG. 3C.

Turning to FIG. 3C, in Step 352, an event is identified by an analyst or algorithmic generator. At Step 354, the ERSM determines whether the event is found in the event class typology (such as the event class typology discussed below in connection with FIGS. 6A-D). If not, the event may be returned to the analyst for further review and evaluation.

If the event is found in the typology, the system proceeds to step 356, where the ERSM begins a scoring process to measure the economic impact of the event. Once an impact score for the event is determined, that score is compared to a threshold. If the score exceeds the threshold, the event is considered to have significant economic impact that warrants further modeling to define a political event contract for the event. Otherwise, the event is considered to have inadequate economic significance to warrant a political event contract. For purposes of the illustrative example described below, it will be assumed that the threshold score for considering a particular event to have significant economic impact is a score of 70 or higher.

Returning to step 356 of FIG. 3C, the ERSM consults the template 320 for the event to determine whether there is a political risk insurance market for this type of event. In a preferred embodiment, if there exists a political risk insurance market for the type of event, that serves as independent confirmation that incorporating the event in a political risk event contract would amount to more than simple speculation and would provide a useful hedging tool. In that case, a score of 100 is assigned to the event. This score is added to field 328 of template 320 and the value of field 330 is set to "Yes." Processing then continues in FIG. 3A where decision step 306 resolves to "Yes."

Otherwise, processing proceeds to step 358 in FIG. 3C, where the ERSM consults template 320 to determine whether the event is hedgeable by an existing simple financial product. In a preferred embodiment, if there already exists a simple financial product that permits hedging against the event, that serves as confirmation that embodying the event in a political risk event contract is not warranted and that the event should not be further modeled. In that case, a score of zero is assigned to the event. This score is added to field 328 of template 320 and the value of field 330 is set to "No." Processing then continues in FIG. 3A where decision step 306 resolves to "No."

By contrast, if at step 358 the event is not hedgeable by a simple vanilla financial product, processing proceeds to step 360 where the ERSM calculates a total impact score for the event and compares that score to the specified threshold. Where the threshold is exceeded, it is considered that the event demonstrates sufficient economic significance to justify further modeling as a potential call. In a preferred embodiment, the total impact score is determined based on a plurality of weighted factors designed to demonstrate whether the event has multiple and complex potential impacts on economic assets such as: FDI exposures, corporate and sovereign debt, equities, currencies, corporate staff, plant, and financial assets. The determination may further preferably consider whether there are similar historical precedents showing economic impact for events of the type under consideration.

One illustrative example of how weighted factors may be used to calculate a total impact score for a proposed political event reflecting the event's economic significance will now be described in connection with FIGS. 3D-E. Beginning with FIG. 3D, magnitude scores are assigned for each of the "estimated magnitude of impact" values used in column 334 of FIG. 3B. Thus, in the illustrative example of FIG. 3D, a magnitude score of 10 is assigned for events with a "low" estimated magnitude and a magnitude score of 90 is assigned for events with a "catastrophic" estimated magnitude. Similarly, geographic scores are assigned for each of the "geographic impact" values used in column 336 of FIG. 3B. Thus, in the illustrative example of FIG. 3D, a geographic score of 1 is assigned for events having a global impact with respect to a specified asset class and a geographic score of 0.25 is assigned for events that have an industry specific impact with respect to a specified asset class.

Next, as shown in FIG. 3E, a weighted impact score is determined for the event. In particular, each Boolean "true" in geographic impact column 336 of template 320 is replaced in the corresponding location in FIG. 3E with its corresponding geographic impact weight and each Boolean "false" is replaced with zero. Similarly, the estimated magnitude values in column 334 of template 320 are replaced with their associated magnitude scores. An asset score is then calculated for each asset class, wherein the asset score is equal to the maximum value of the products of each geographic score by the magnitude score for the asset class. A weighted average of these asset scores is set as the total impact score for the event.

In a preferred embodiment, the scores for asset classes associated with capital markets are given more weight in determining the weighted average than those associated with FDI variables because the former are "broad" risks, whereas the latter, more corporate-related risks, are "narrow" risks that in many cases can be specific to a single corporation/industrial sector. Thus, for example, in a preferred embodiment, the impact scores for the capital markets variables equity markets, corporate debt markets, sovereign debt markets, and commodity markets are weighted by a factor of three as compared to the corporate financial assets variable, corporate infrastructure/plant variable, and corporate staff safety/ability to operate variable.

This total impact score is stored in field 328 of template 320. When the score meets the specified threshold (e.g., 70), the value of field 330 of template 320 is set to "Yes," and processing then continues in FIG. 3A where decision step 306 resolves to "Yes." Otherwise, the value of field 330 of template 320 is set to "No," and decision step 306 in FIG. 3A resolves to "No."

In an alternative preferred embodiment, the impact of step 358 on the outcome of the event relevance scoring may be made quantitative instead of Boolean. In particular, where the outcome of step 358 is that the event is hedgeable by a simple vanilla financial product, processing may in any event proceed to step 360 for a scoring of the event. The impact of the existence of a simple vanilla financial product may be reflected in the calculated score by subtracting a specified number of points, such as 100 points, from the score determined in step 360. In this way, many events will fail to exceed the scoring threshold established in step 360 even if they otherwise have a relatively high score, and only those with very high relevance scores will be identified as warranting further structuring for use in defining a political event contract.

In Step 308 of FIG. 3A, management responsible for defining the political event contracts reviews the event proposals presented by analysts to determine whether or not those events represent suitable choices for structuring contracts. As used herein, "management" refers to the team supervising the process which preferably includes a mixture of senior research and management staff that has business development, regulatory, and subject matter expertise. In reaching this determination, management preferably reviews the results of the initial selection process and the ESRM to ensure that it has not resulted in an insensible result. Management may also consider other factors in determining whether a particular event represents a suitable choice for structuring a contract such as the degree, if any, of explicit client interest in particular events which may be expressed to management through, for example, collection of commercial input from the client side.

As shown at decision Step 308, if management determines that an analyst submission fails to establish that an event is suitable for modeling as a political event contract, it may provide feedback to the analyst or analysts that submitted the proposed event, or request modifications or further information concerning the proposed event. The revised submission can then be reevaluated by management. Otherwise, if the management decision as to an event is that it should be modeled, the process proceeds to FIG. 4 as will now be described.

More specifically, once an event is selected for modeling, the next step in the process of creating a political event contract is to specify in detail the terms of the event as will be set forth in the finished contract. This aspect of the process is depicted in FIG. 4. As shown at Step 402, the analyst or analysts define the event as a single binary event capable of specific and unequivocal determination. In conducting the analysis to perform this step, the analyst may draw on and utilize binary call modeling templates and spreadsheets (Step 404) as will be discussed in further detail below, and may utilize order compliance tools including redteam for call (i.e., a team tasked with arguing for the contrary or "devil's advocate" position) and binary model compliance in order to ensure that the proposed binary structure for an event satisfies pre-existing requirements (Step 406).

In some embodiments, the methodology used for creating binary calls may be expanded to create calls that have more than potential binary outcomes. Thus, a political risk event call may be defined for any event that is determined to have a number of mutually exclusive and comprehensively exhaustive potential outcomes of which only one final outcome is, however, possible. For instance, a first past-the-post election with four candidates, of which only one candidate wins could be modeled using the methodology described herein. For ease of illustration, a process for creating a binary call will be described herein. It will be recognized, however, that an analogous methodology and process to that described herein may also be applied to create calls having three or more potential, exclusive, and finite outcomes.

In creating an event definition suitable for a political event contract, the analyst preferably considers a number of factors, as shown in Step 408. These factors may include:

Call specification: Is the event divisible into two or more mutually exclusive and comprehensively exhaustive (MECE) outcomes?
2. Event description: What are the key details or features of the event?
3. Timing of event: Can the event be timed?
4. Location of event: What is the location where the event will occur?
5. Proof of occurrence: What evidence will be sufficient to establish that the event has occurred?
6. Arbiter of event: Who decides whether or not the event has occurred?

In a preferred embodiment, a typology of political events is created in which political events are classified in different categories to facilitate uniform treatment and handling of different political events in the contract creation process. One reason why the categorization of political events is useful is that different types of potential buyers and sellers of such contracts may have specific exposures to varying types of political risk, and thus differing interest in specific ones of the defined categories. In addition, in some cases, certain categories of political risk events may be sufficiently insurable (either partially or fully) such that there may be less need for derivative instruments incorporating such political events.

One preferred embodiment for creating a typology of political events is shown in FIGS. 6A-D. As shown in FIGS.

6A-D, the universe of potential political events is divided up into categories listed in column 602. In the exemplary organization shown in FIGS. 6A-D, these categories include regime/government change; extra-electoral changes; policy changes; international politics; civil violence; international warfare; and one-off-events. Each of these categories include one or more specific events that belong to the category as shown in column 604. In column 606, the typology records the types of instrument likely to be impacted by the events at issue. In column 608, the typology tracks whether or not political insurance is available for the type of event at issue. In column 610, the typology tracks whether or not the particular events are regularly occurring. The chart may also include a column 612, for listing illustrative examples of the type of events categorized by the typology.

As noted above, templates may also be defined to facilitate the definition of events by analysts. One exemplary event sheet suitable for defining the parameters of an event to be used as the basis of a political event contract is shown in FIGS. 7A-B. As shown in FIGS. 7A-B, each event sheet preferably includes an entry 702 for a one sentence definition of the event name, an entry 704 for the timing of the event, an entry 706 for the location of the event, an entry 708 for an explanation of the event (limited for example to eighty words), an entry 710 for specifying what will constitute acceptable proof that the event has occurred, and an entry 712 for defining who or what will be the arbiter for determining whether the event has occurred. In addition, the template may preferably provide an event characteristics section 714 in which analysts may choose one or more characteristics such as magnitude, location, and parties involved to facilitate description of the event. In addition, the template may preferably comprise an entry 716 for impact of event which provides the analyst an opportunity to describe the markets or entities that are likely to be impacted by the event. In addition, the event sheet template may preferably comprise a section 718 for entering assumptions where the analysts may identify events or issues that would invalidate the contract. For instance, if the event is an election, and the outcome of the election is a civil war or a declaration of a rival parliament, these may be identified as exceptions that would invalidate the contract.

In addition, as shown in FIG. 7C, a supplemental table may be provided for the event sheet template to allow further explanation of the event by the analyst. As illustrated in FIG. 7C, the supplemental table may comprise an entry 720 to permit the analyst to specify whether the event is a proxy for another political event, an entry 722 to permit the analyst to list one or more causes for the event, and an entry 724 to permit the analyst to specify the potential impact of the event.

Returning to FIG. 4, in Step 410 the event is modeled. As shown at Step 410, the analysts consider goal and binary alternatives which may be analyzed using a model specification. In addition, criteria and sub-criteria specification may be utilized. In a preferred embodiment, the criteria and sub-criteria specification may include a number of distinct factors such as:

1. Who are the key decision-makers?
2. Which are the key constituencies?
3. What interests are at stake?
4. What policy changes can act as decision-triggers?

As indicated by the broken line connecting Step 410 of FIG. 4 with Step 508 of FIG. 5, the analysts may also at this stage attempt to assign a probability for the contract that is being developed. A methodology for implementing Step 508 of FIG. 5 will be described in more detail below.

Next, in Step 412, the management team responsible for approving the political event contract evaluates the specified event as defined by the analyst to determine whether or not it is satisfactory and should be incorporated in a political event contract for trading. In making this determination, management preferably reconfirms that the specified event underlying the proposed political event contract is clearly defined and definitively binary in outcome. Otherwise, the specified event is returned to the primary analyst for refinement or revisions.

FIG. 5 illustrates a process for conducting final review and probability assignment for the proposed political event contract. Upon conclusion of the steps performed in FIG. 5, the contract is ready for trading on an exchange or other trading platform such as that described above in connection with FIG. 1.

At Step 502 of FIG. 5, a derivative contract for the selected political event is created. In a preferred embodiment, the contract may be created using a standard derivative contract template that includes standard terms of a derivative contract. The contract template is customized to the individual political event by adding the specific definition of the event including the proof of occurrence and arbiter of occurrence definitions for the event to the contract. In Step 504, the contract is preferably reviewed in a final management editorial review to confirm that it accurately reflects the event under consideration, and that the event is sufficiently defined. In Step 506, a determination is made as to whether it is necessary or desirable to mark to model the value of the contract. If so, then a probability for the political event contract is determined (Step 508). This modeling process may also be conducted as often as required thereafter and may, for example, be used by clearinghouse 114 to mark to model the positions of the clearing members and (alone or in combination with marking the positions of clearing members to market using actual trading data as discussed above) to determine and manage their guaranty deposit requirements.

Preferred embodiments for modeling the value of a specified political event contract will now be described in connection with FIGS. 8-16. Assigning probabilities to political events is a difficult process that must take into consideration both qualitative and quantitative variables. In a preferred embodiment, the methodology utilized for calculating probabilities of political events in the present system and method provides transparency, flexibility, and thoroughness and permits standardization of probability analysis across different types of political event contracts. The determined value of a political event contract is preferably expressed as a probability that represents the likelihood of the event occurring.

There are numerous different methods for assigning probabilities to political events. The most suitable type of methodology for valuing a given political event contract is a function of the particular political event at issue. For certain events, existing political data can be used. Economic and social data series can also sometimes be used to correlate two political events. For events occurring with some frequency, indices can often be created or used, either singularly or in varying combinations. For some events, it is possible to use or construct historical data-series to use in statistical models. For instance, it is possible to use the frequency of coup d'etats in West Africa to come up with a base line for a generic statistical probability of a coup in any country in that region. That probability can then be modified by creating country-specific proxy variables from qualitative analysis. Similarly, models can be built for things such as avian flu, civil war occurrence, or expropriations. The complexity and usefulness of these models can differ, depending on the availability and accuracy of data.

Many types of political events, however, cannot be accurately quantified using existing time series or even constructed proxies. For events that have low frequency, do not easily subscribe to a given typology, or are complex in nature, use of "pure" quantitative models can result in noise or inaccurate probabilities. Such events are more accurately considered using structured qualitative analysis and specific analyst country and political expertise. Often this expertise can be thoroughly structured and then ranked or combined with existing quantitative measures to give more accurate probabilities.

One methodology for evaluating political events to determine their likelihood of occurrence was developed by Sherman Kent, Head of the Office of National Estimates in the Central Intelligence Agency. Kent suggested the following terminology for describing the absolute level of probability of an event occurring:

| 100% Certainty<br>The General Area of Possibility | |
|---|---|
| 93% give or take about 6% | Almost certain |
| 75% give or take about 12% | Probable |
| 50% give or take about 10% | Chances about even |
| 30% give or take about 10% | Probably not |
| 7% give or take about 5% | Almost certainly not |
| 0% Impossibility | |

This method is qualitatively driven and requires significant analyst input. Improvements on this method include use of multiple analysts (through, e.g., surveys) and the more thorough analytical hierarchy process ("AHP") described in more detail below.

Another method for assigning a probability to a highly complex political event uses multiple experts to create an expert-driven "virtual market." In this methodology, an expert market or survey is used that asks a wide range of analysts to rank or rate a specific issue. This can be done either as a virtual trading game, or more traditionally through a so-called expert "delphi" survey, that requires analysts to rank or directly assign probabilities using a Kent method table.

A third class of methodologies mixes data and qualitative analysis to create a model that combines "hard" quantitative time series with qualitative rankings of political risks. This is akin to how credit ratings agencies such as S&P, Moody's, and Fitch create credit ratings for both corporations and sovereigns. The Global Political Risk Index (GPRI) published by Eurasia Group, assignee of the present invention, is an example that focuses on country political stability and tracks the components of country stability in a comparative framework for twenty-four key emerging market countries. The GPRI tracks twenty variables. Most of the non-economic variables are ranked monthly by Eurasia Group analysts, while the economic variables are a combination of analyst input and hard data series.

For certain types of political events, some of the methods discussed above may be more accurate than others at measuring the likelihood of occurrence of an event. The matrix shown in FIG. 8 briefly outlines the methodologies best suited to this purpose, by political event type. As FIG. 8 demonstrates, one preferred methodology suitable for use in the present system and method for valuing a wide variety of political event contracts is the analytical hierarchy process or AHP. This is one of many operations research decisions analysis methods that can be used to assess probabilistic outcomes based on structured qualitative information.

As known in the art, AHP is a mathematical method for assessing different qualitative alternatives. It is commonly used in decision analysis, organizational research, and risk management. It offers a structure for quantifying problems consisting of many qualitative components for the purposes of comparing relative likelihood. AHP impacts complex questions by identifying and ranking the specific factors that are expected to determine alternative event outcomes. The factors are assessed in pairs by analysts or other users and expected outcomes for each variable are suggested using a ranking scale, as will be described in more detail below. In a preferred embodiment, the AHP implementation of the present invention uses an algorithm that uses inputs from analysts to check for internal logical consistency in the pairwise assessments and to calculate relative probabilities of the alternative event outcomes using matrix (linear) algebra. Software programs for conducting AHP analysis are available from a number of vendors and include Criterium Decision Plus, Web Hipre+, Expert Choice, and Decision Lens. Software programming for implementing the AHP analysis described below may also be specifically written for use in the present system and method.

AHP is particularly well suited for use in the present invention because it is able to capture both rational and intuitive analysis about an event. It is also a highly structured method for calculating relative probabilities based on pairwise comparisons. It comprises transparent assumptions that are easily auditable and allows the calculation of probabilities by transforming qualitative assumptions into statistical data. It is therefore replicable from event to event, while maintaining certain methodological assumptions. It is also easy to readjust probabilities as real world events occur by adjusting parameters in the AHP process. As discussed below, this adjustability may be leveraged to facilitate sensitivity analysis where a user models changes in different parameters to assess the overall impact of such parameter changes on the probability of a given outcome for a specified event.

Figure 9:
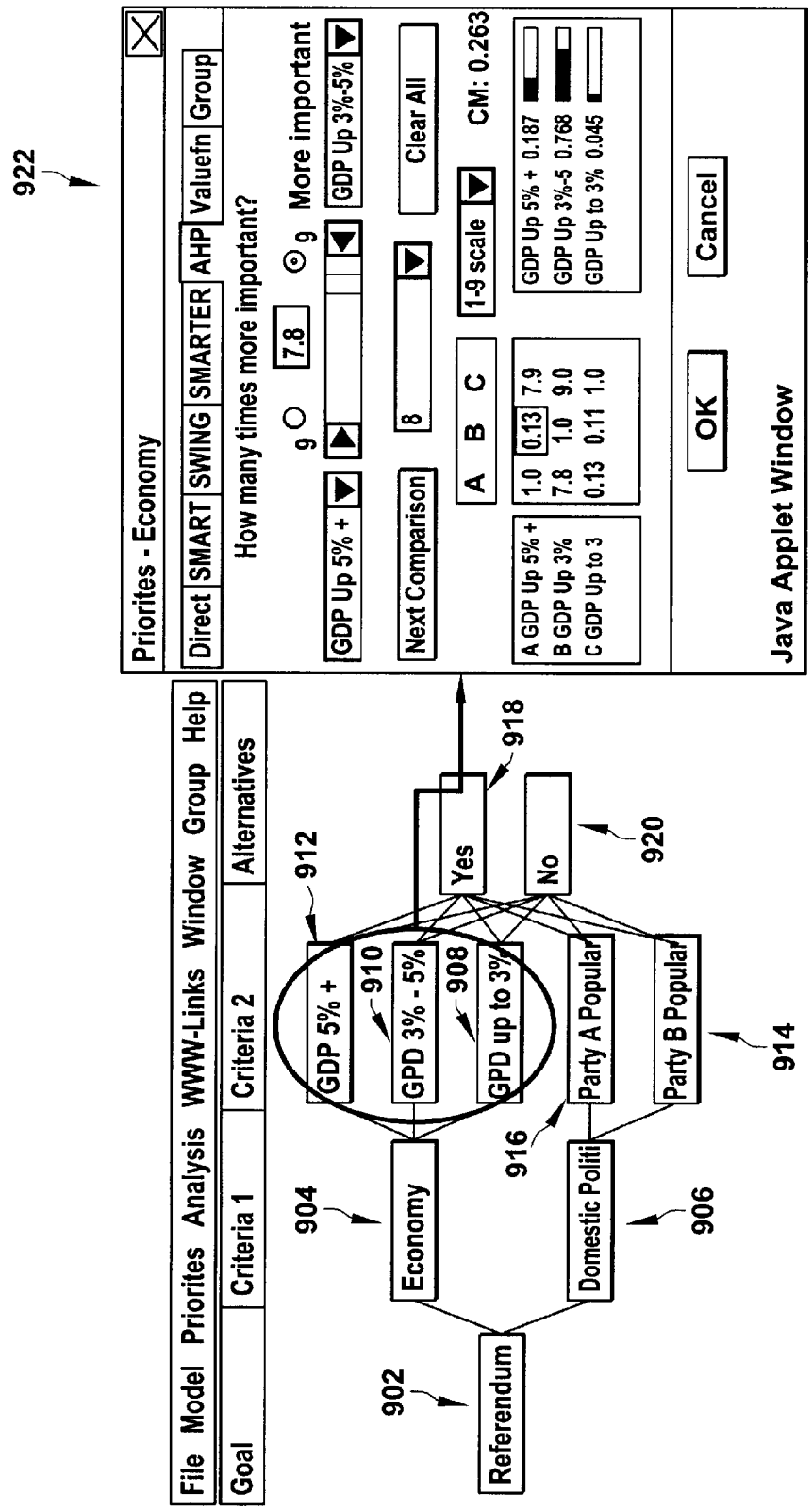
FIGS. 9-16 illustrate examples of using an AHP process to determine the likelihood of event outcome for exemplary events.

Turning now to FIG. 9, a relatively simple example of an AHP process for determining a likelihood of event outcome is shown. It should be recognized that although the screen shots of FIG. 9 (and FIGS. 10-16) are shown in black and white to satisfy drawing requirements, they will preferably be shown in color on the user's screen in actual operation to allow the user to easily distinguish between different categories and values of displayed data and information.

As can been seen from FIG. 9, the AHP process utilizes criteria based decision trees. The components of the tree are weighted and compared by an analyst or other user to determine probabilities for the various alternative outcomes shown. More specifically, in the example of FIG. 9, a referendum in a particular country is being considered and the event to be evaluated is whether the referendum will pass. The ultimate event being considered is identified in a box 902 in the column labeled "Goal." The next column, labeled "Criteria 1" identifies two high level components that may contribute to whether the referendum passes. In this illustrative example, whether the referendum passes is considered to depend on two factors: the economy (box 904) and domestic politics (box 906).

Each of these two factors is then further broken down into two or more potential outcomes shown in the next column labeled "Criteria 2." With respect to the economy factor, the outcomes are GDP increases by less than 3% (box 908), GDP increases by 3-5% (box 910), or GDP increases by more than 5% (box 912). Similarly, with respect to the domestic politics factor, the outcomes are Party A more popular than Party B (box 914) and Party B more popular than Party A (box 916).

Finally, the two possible alternatives for the referendum, that the referendum will pass (box 918) or that the referendum will fail (box 920), are identified in the column labeled "Alternatives."

Figure 10:
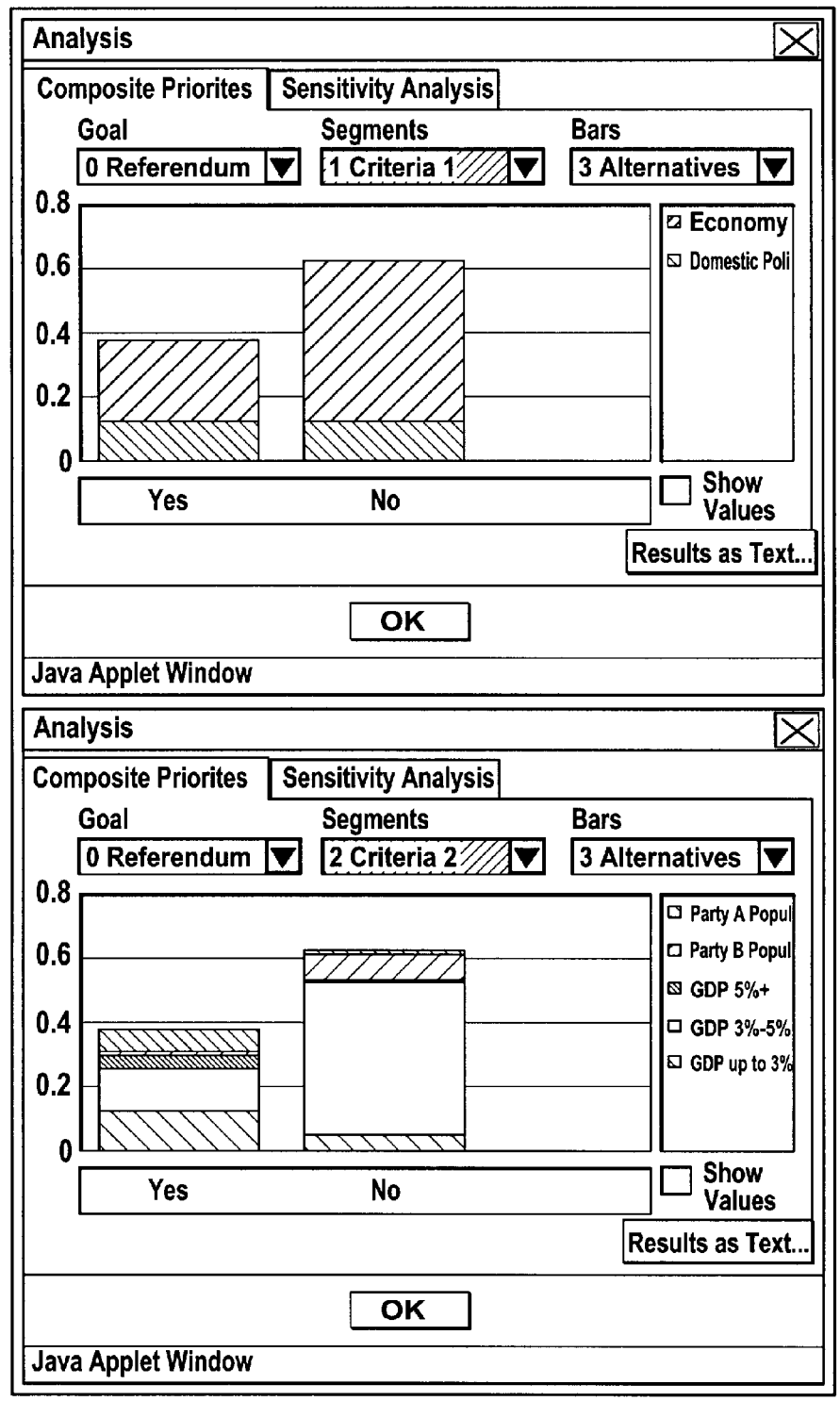

To use the AHP model, an analyst or other user conducts pair-wise comparisons of the displayed parameters at each level of the hierarchy. More specifically, using a user interface such as user interface 922 the analyst or other user rates the relative importance (in the user's estimation) of such parameter to the overall outcome of the event being considered. In the illustrative example shown in FIG. 9, the user's opinion is that, on a scale of 1 to 9, a GDP increase of 3-5% would exert 7.8 times more impact on the referendum outcome than a GDP increase of greater than 5%. The AHP software processes these user inputs to generate relative weights for the different parameters. As shown in window 924 of user interface 922, in the illustrative example shown, the user's pair-wise inputs translate into relative weights of 0.187 for GDP up more than 5%, 0.768 for GDP up 3-5%, and 0.045 for GDP up less than 3%. This process is repeated at each level of the hierarchy and the overall results of the user pair-wise comparisons are scored, normalized, and summed up by the AHP software using a number of matrices. Consistency scores are also calculated. An illustrative example of the output created by the AHP analysis is shown in FIG. 10. As shown in FIG. 10, the hypothetical referendum is judged to have a 39% (i.e., 0.39) probability of passing and a 69% (i.e., 0.69) probability of failing based on the user's input concerning the relative significance and likely outcome of the various parameters selected to model the event in question.

Figure 11:
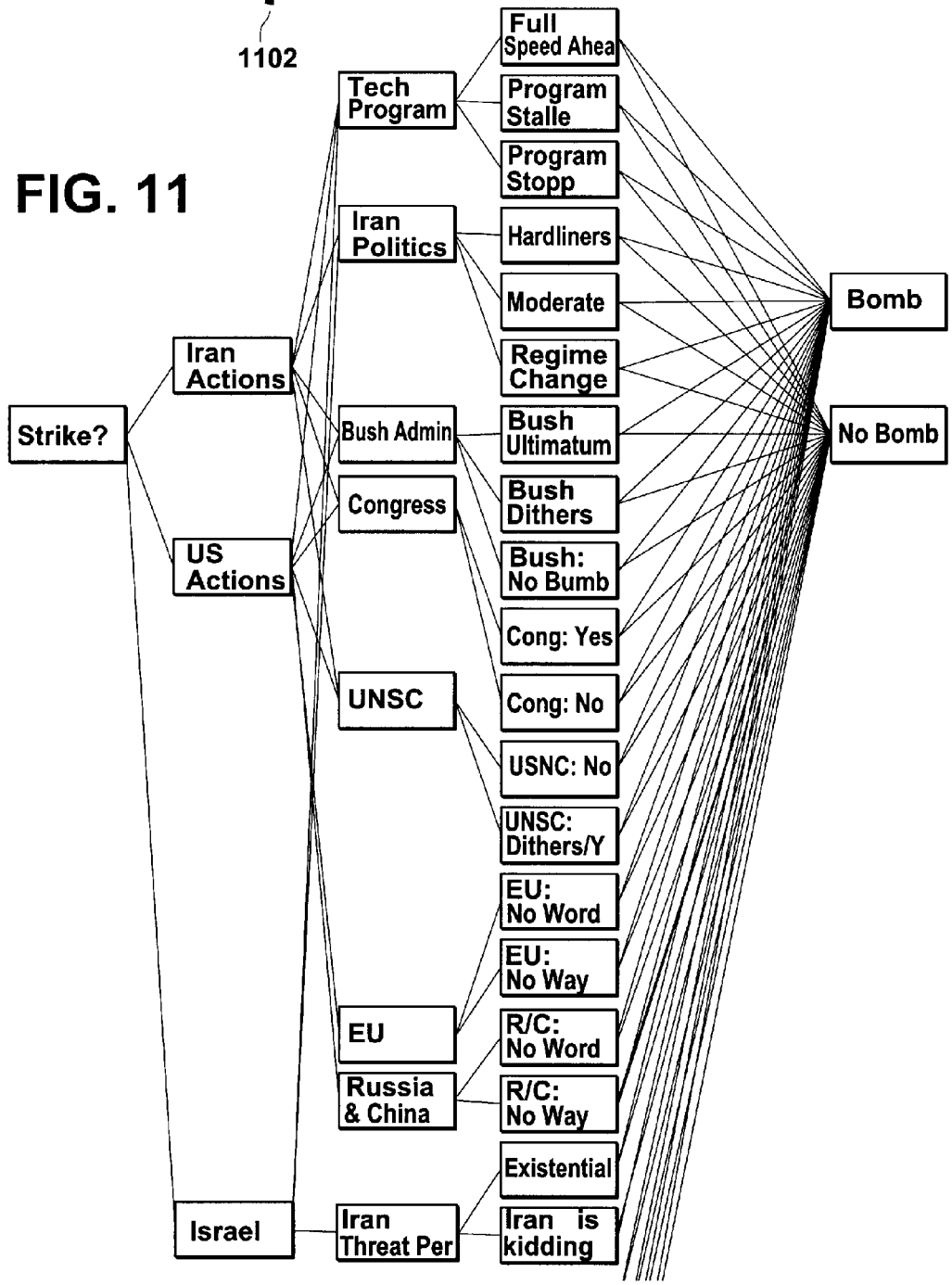

Application of AHP to a number of more sophisticated exemplary political events will now be described in connection with FIGS. 11-16. For purposes of the present example, it will be assumed that the description for the first event is: "By Sep. 1, 2008, U.S. and/or Israeli surgical strikes occur against Iran's nuclear facilities." The trigger for this event will be assumed to be: "FEP at Natanz is attack by U.S. and/or Israel." The arbiter of the event is assumed to be: "the U.S. and Iranian government both acknowledging that the attack has occurred." Turning now to FIG. 11, there is shown an exemplary AHP diagram for modeling this political event. As shown in FIG. 11, the main criteria one level factors 1102 are defined to be Iran actions, U.S. actions, and Israel actions. These criteria are further broken down into sub-criteria as shown in the figure, and two binary outcomes are defined for the event.

Figure 12:
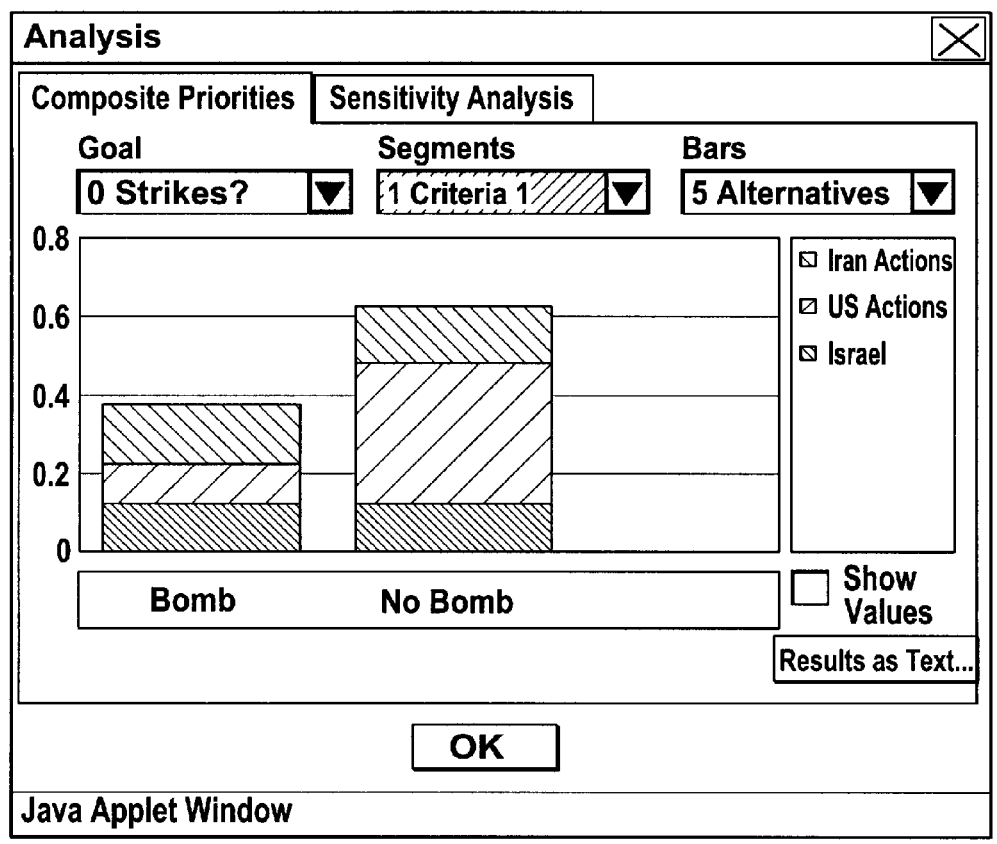

An exemplary analysis screen for this event is shown in FIG. 12. As shown in FIG. 12, based on the user's input, the model predicts a 34% probability of an attack occurring and a 66% probability that an attack will not occur.

Figure 13:
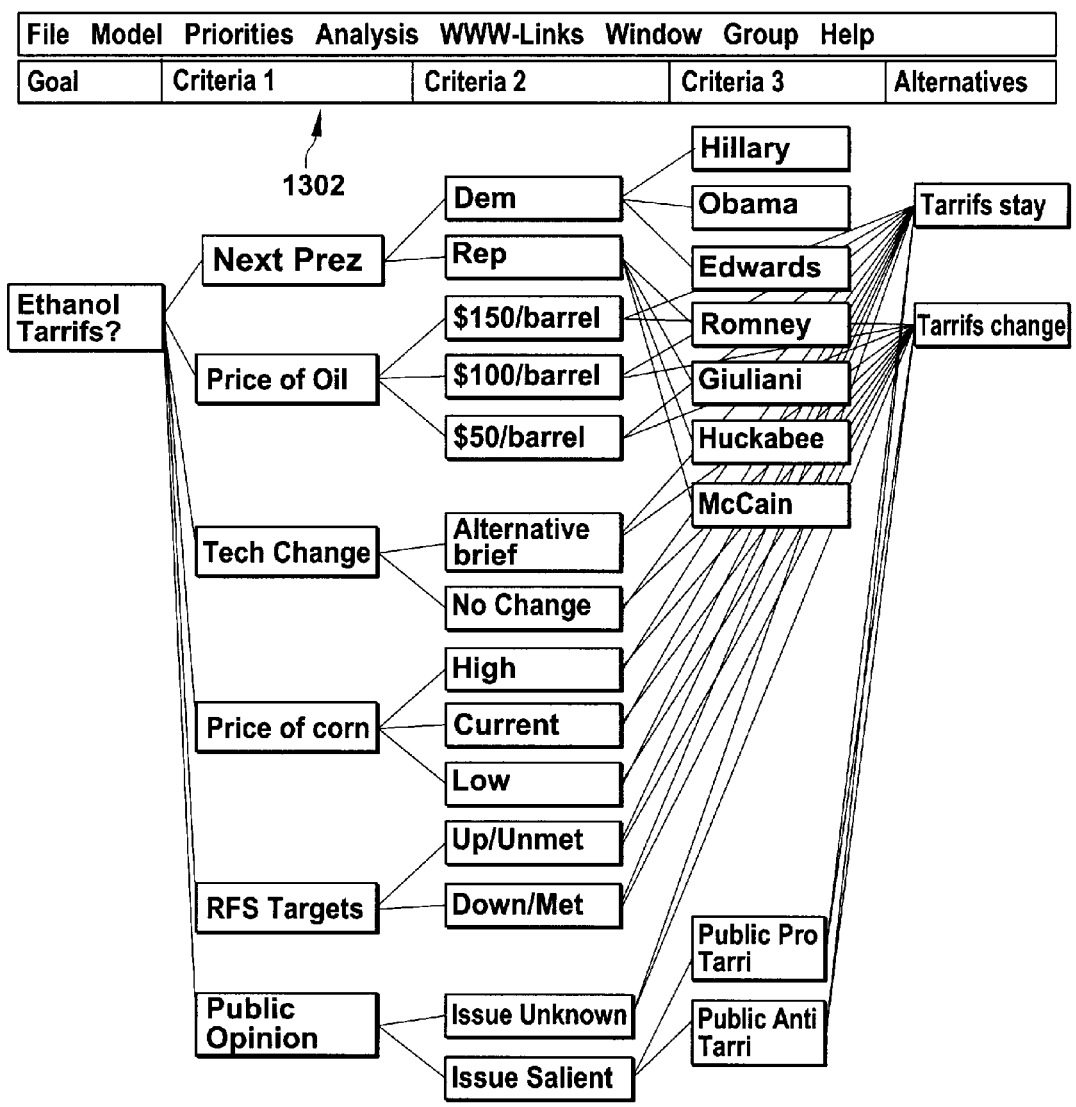

Application of AHP to a second exemplary political event will now be described in connection with FIGS. 13-14. For purposes of the present example, it will be assumed that the description for the first event is: "U.S. Congress passes ethanol tariff reductions by Jan. 1, 2010." The trigger for this event will be assumed to be: "U.S. Congress vote and no presidential veto." The arbiter of the event is assumed to be: "U.S. Congressional Record reports tariffs as being passed." Turning now to FIG. 13, there is shown an exemplary AHP diagram for modeling this political event. As shown in FIG. 13, the main criteria one level factors 1302 are defined to be next President, price of oil, tech change, price of corn, RFS targets, and public opinion. These criteria are further broken down into sub-criteria as shown in the figure, and two binary outcomes are defined for the event.

Figure 14:
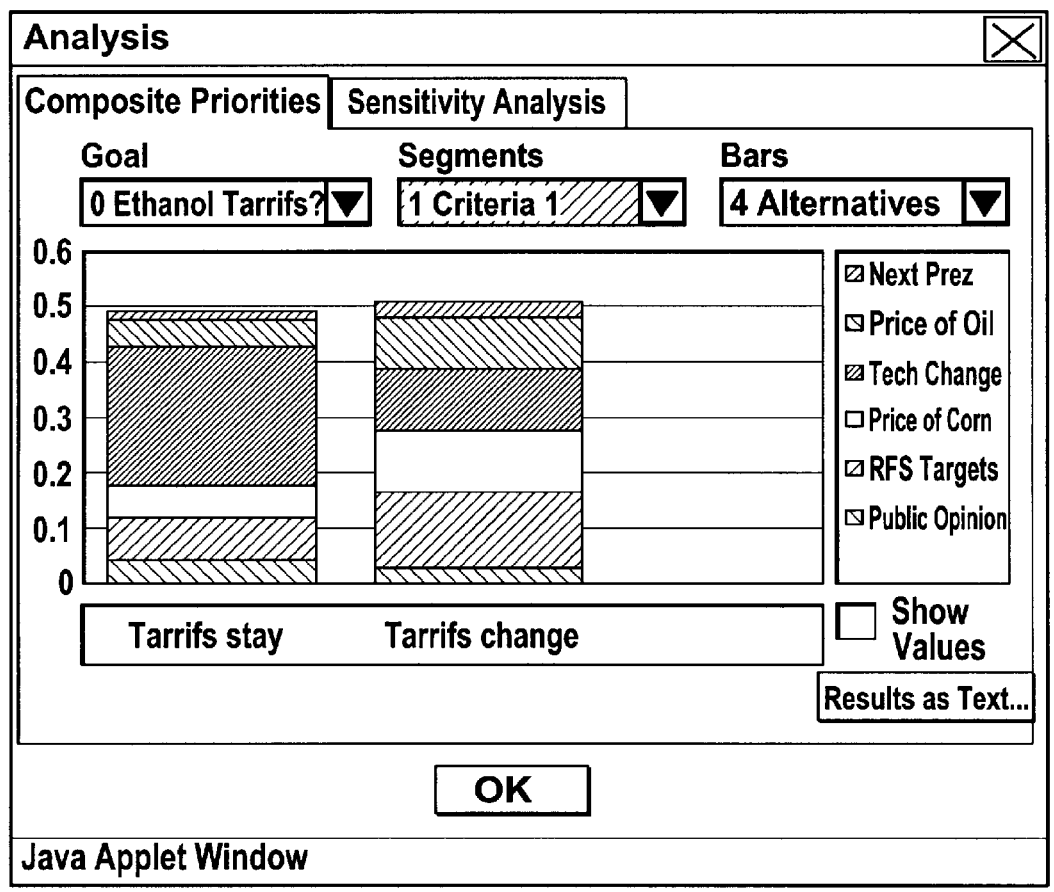

An exemplary analysis screen for this event is shown in FIG. 14. As shown in FIG. 14, based on the user's input, the model predicts a 49% probability that ethanol tariffs will remain unchanged and a 51% probability that tariffs will be modified.

Figure 15:
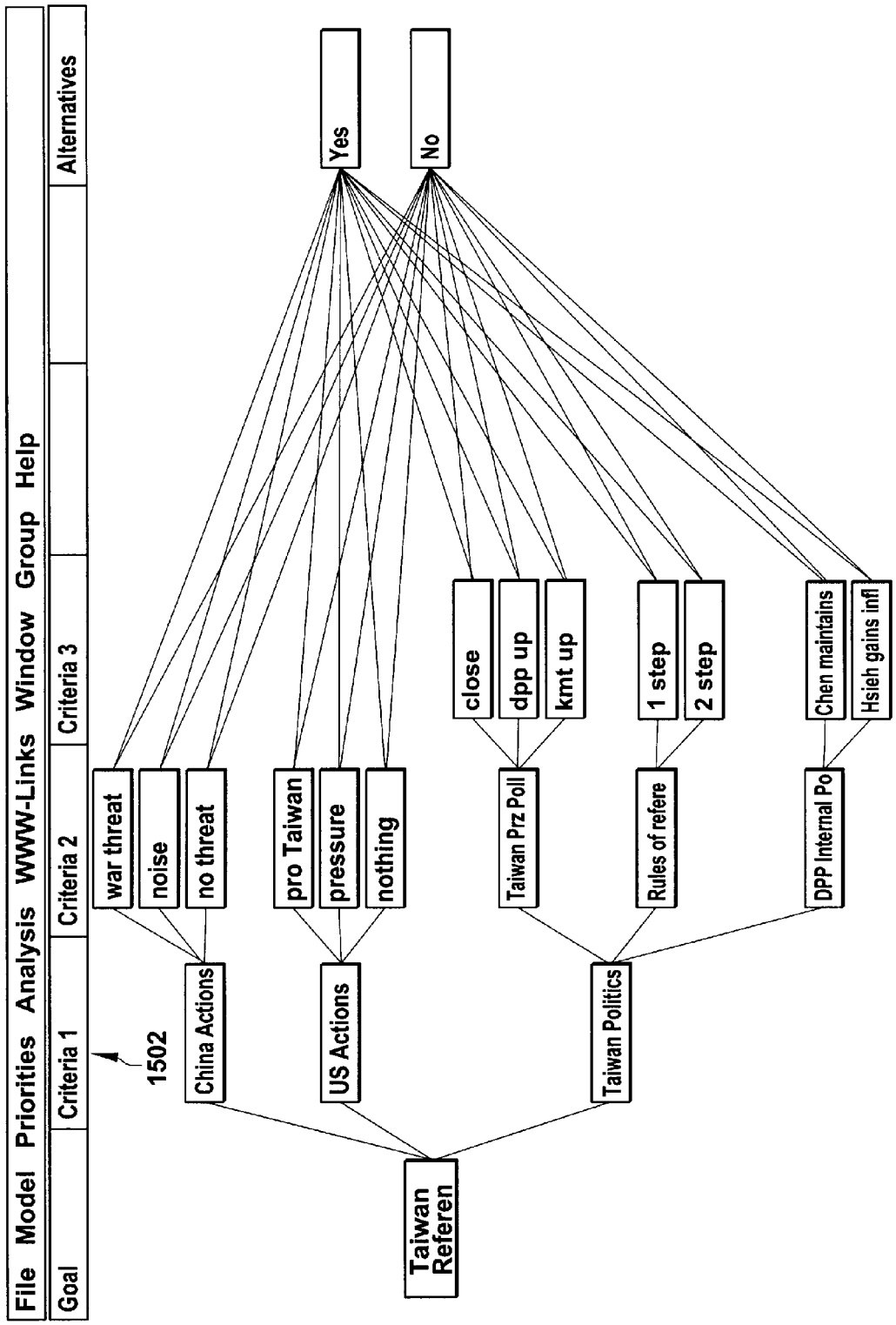

Application of AHP to a third exemplary political event will now be described in connection with FIGS. 15-16. For purposes of the present example, it will be assumed that the description for the first event is: "Taiwan passes a referendum on joining the United Nations under the name of Taiwan in March 2008." The trigger for this event will be assumed to be: "Electoral results as confirmed by Taiwan's Electoral Commission." The arbiter of the event is assumed to be: "Central Electoral Commission of Taiwan." Turning now to FIG. 15, there is shown an exemplary AHP diagram for modeling this political event. As shown in FIG. 15, the main criteria one level factors 1502 are defined to be China actions, U.S. actions, and Taiwan politics. These criteria are further broken down into sub-criteria as shown in the figure, and two binary outcomes are defined for the event.

Figure 16:
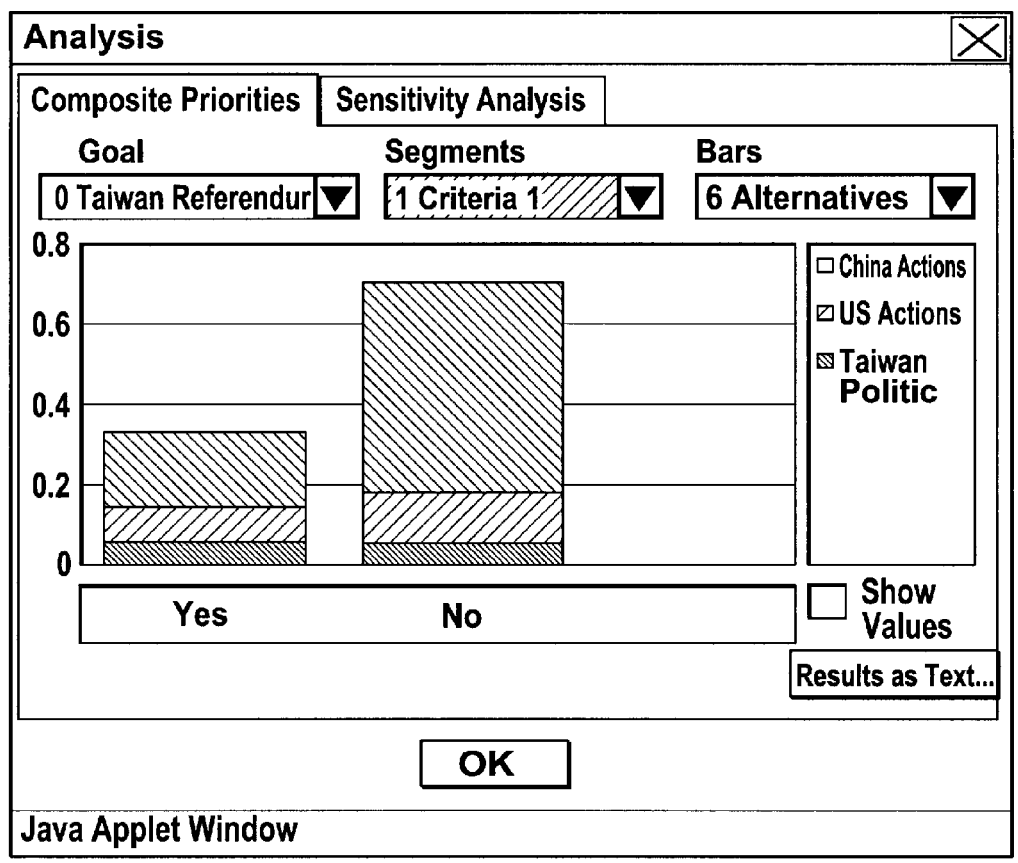

An exemplary analysis screen for this event is shown in FIG. 16. As shown in FIG. 16, based on the user's input, the model predicts a 31% probability that the referendum will pass and a 69% probability that the referendum will not pass.

An exemplary trading screen which may preferably form part of user interface 204 of trading terminal 104 will now be described in connection with FIG. 17. As shown in FIG. 17, the exemplary trading screen preferably comprises a market window 1702 that displays to the trader a snapshot of the current market with respect to contracts of interest to the trader. Market window 1702 preferably comprises columns to identify each contract by contract number and brief description. The contracts to be displayed may preferably be selected by the trader, and are shown in this example to be the U.S./Israeli strike against Iranian Nuclear Facilities, U.S. reductions on ethanol import tariffs, and the referendum as to whether Taiwan will join the United Nations under the name Taiwan described above. Market window 1702 also preferably comprises columns for showing the quantity and price bid for each contract on the buy side of the market and the quantity and price asked for each contract on the sell side of the market to a specified market depth preferably configurable by the trader. Market window 1702 may further comprise a column summarizing the last transaction for the contract executed in the market.

The trading screen may also preferably comprise a pending orders window 1704 which preferably displays all of the trader's pending orders in the market. As can be seen in the illustrative example of FIG. 17, pending order window 1704 informs the trader that fifteen of the contracts available in the market to buy Contract No. 47652 at a price of 29, and the ten contracts of Contract No. 74926 available to sell at a price of 31, represent his or her own orders.

In a preferred embodiment, each order in pending order window 1704 is provided with a button labeled "Model." Selection of that button by the trader preferably causes a window to open on the trader's screen providing the trader with an AHP modeling display analogous to that described above. The AHP modeling display is preferably adapted to allow the trader to modify the relative weights for each set of pair-wise comparisons so that the trader can model the impact of changing parameters on the overall likelihood of the event under consideration. The AHP modeling display may also be adapted to allow the trader to add or delete criteria at each level of the hierarchy so as to give the trader maximum flexibility to understand pricing for a given contract and to determine for himself or herself the expected value of the contract.

The trading screen also preferably comprises a transaction window 1706 for entering orders in the market. Transaction window 1706 preferably comprises a field for entering the number of the contract to be traded and which may comprise a drop down arrow to allow the trader to select from a pre-set list of contracts. Transaction window 1706 also preferably comprises price and quantity fields for entering the desired price and quantity of a contract to be purchased. Buy and sell buttons are also provided which may be selected by the trader to enter an order to buy or sell a given quantity of a contract at a specified price. Trading window 1704 also preferably comprises a "Model" button which when selected by the trader opens an AHP modeling window as described above to permit the trader to analyze and evaluate the effect of changing criteria and sub-criteria on the expected value of a contract.

An exemplary embodiment of a blotter screen which may preferably form part of user interface 204 of trading terminal 104 will now be described in connection with FIG. 18. As shown in FIG. 18, a trading blotter 1802 preferably comprises columns to identify each contract by contract number and brief description. The blotter further preferably comprises columns for listing the status of each of the trader's orders, whether the order was a buy or sell, the price and quantity of the order, and the time an order was matched or executed.

While the invention has been described in conjunction with specific embodiments, it is evident that numerous alternatives, modifications, and variations will be apparent to those skilled in the art in light of the foregoing description.

The invention claimed is:

1. A computer implemented system for defining and structuring political event contracts, comprising:
   an event relevant scoring mechanism configured to evaluate event proposals submitted by an analyst to measure the market relevance of the event proposals, each event proposal comprising a proposed event, the event relevant scoring mechanism configured to determine whether:
      (i) an event proposal is part of an event class typology set; and
      (ii) there exists political risk insurance for the proposed event that is the subject of the event proposal,
   the system being configured to continue processing the event proposal where the proposed event is part of the event class typology set and there exists political risk insurance for the proposed event,
   the event relevant scoring mechanism comprising a scoring component configured to calculate a total impact score for the proposed event reflecting the economic significance of the proposed event, wherein the total impact score is determined as a function of one or more impact values and one or more geographic values, the system being configured to continue processing the event proposal where the total impact score exceeds a predetermined threshold;
   an event definition component configured to maintain event definition information comprising: divisibility of the proposed event into two or more mutually exclusive outcomes, a timing of the proposed event, a location of the proposed event, and a proof of occurrence of the proposed event;
   a modeling component configured to model the probability of occurrence of the proposed event, the modeling component comprising a pair-wise comparison modeling tool.

2. The computer implemented system of claim 1, wherein the event definition information comprises information identifying an arbiter of the event that is the subject of the event proposal.

3. The computer implemented system of claim 1, wherein the event relevant scoring mechanism is further configured to determine whether the proposed event is hedgeable by an existing financial product, and wherein the system is configured to continue processing the event proposal where the proposed event is not hedgeable by an existing simple financial product.

* * * * *